(12) United States Patent
Sprouse et al.

(10) Patent No.: US 8,685,120 B2
(45) Date of Patent: Apr. 1, 2014

(54) METHOD AND APPARATUS TO PRODUCE SYNTHETIC GAS

(75) Inventors: Kenneth M. Sprouse, Northridge, CA (US); Shahram Farhangi, Woodland Hills, CA (US); Robert M. Saxelby, Simi Valley, CA (US)

(73) Assignee: General Electric Company, Schenectady, NY (US)

( * ) Notice: Subject to any disclaimer, the term of this patent is extended or adjusted under 35 U.S.C. 154(b) by 722 days.

(21) Appl. No.: 12/538,949

(22) Filed: Aug. 11, 2009

(65) Prior Publication Data

US 2011/0036011 A1    Feb. 17, 2011

(51) Int. Cl.
*F16K 49/00* (2006.01)
*B01J 7/00* (2006.01)

(52) U.S. Cl.
USPC .............................................. 48/61; 137/334

(58) Field of Classification Search
None
See application file for complete search history.

(56) References Cited

U.S. PATENT DOCUMENTS

| | | | | |
|---|---|---|---|---|
| 4,443,228 A | * | 4/1984 | Schlinger | 48/86 R |
| 4,443,230 A | * | 4/1984 | Stellaccio | 48/197 R |
| 4,618,323 A | | 10/1986 | Mansour | |
| 4,685,404 A | | 8/1987 | Sheppard et al. | |
| 4,941,779 A | | 7/1990 | Dewitz et al. | |
| 5,643,394 A | | 7/1997 | Maydan et al. | |
| 5,785,721 A | * | 7/1998 | Brooker | 48/86 R |
| 5,813,846 A | | 9/1998 | Newby et al. | |

(Continued)

FOREIGN PATENT DOCUMENTS

| | | |
|---|---|---|
| CN | 1032497 A | 4/1989 |
| CN | 101098750 A | 1/2008 |
| JP | 2003226883 A | 8/2003 |

OTHER PUBLICATIONS

FCCU Feed Injector Cold Flow Modeling 90EN194/91017, Texaco CE&P Engineering Division, 5 pages.

(Continued)

*Primary Examiner* — Imran Akram
(74) *Attorney, Agent, or Firm* — Armstrong Teasdale LLP

(57) ABSTRACT

A method of producing a synthetic gas (syngas) includes injecting a plurality of reactant streams into a gasification reactor via at least one injection device having a plurality of injection annuli, an inner portion that extends annularly about a centerline extending through the at least one injection device, and an outer portion extending substantially annularly about the inner portion. At least a portion of the outer portion is oriented obliquely with respect to the at least one injection device centerline. The method also includes mixing at least a portion of each of the streams together such that a plurality of recirculation zones is defined by the streams. The method further includes producing a syngas within the recirculation zones via mixing at least a portion of each of the streams. The injection device includes an inner portion that extends annularly about a centerline extending through the injection device. The device also includes an outer portion extending substantially annularly about the inner portion that includes at least one of at least one carbonaceous reactant injection port oriented obliquely with respect to the injection device centerline and at least one outer face oriented obliquely with respect to the injection device centerline.

22 Claims, 15 Drawing Sheets

(56) References Cited

U.S. PATENT DOCUMENTS

| | | | |
|---|---|---|---|
| 5,823,122 | A | 10/1998 | Chronowski et al. |
| 5,947,716 | A | 9/1999 | Bellamy et al. |
| 6,609,905 | B2 | 8/2003 | Eroglu et al. |
| 6,679,049 | B2 | 1/2004 | Kline et al. |
| 6,807,804 | B2 | 10/2004 | Kline et al. |
| 6,820,412 | B2 | 11/2004 | Kline et al. |
| 2001/0022170 | A1 | 9/2001 | Okamoto et al. |
| 2004/0067461 | A1 | 4/2004 | Ranke et al. |
| 2006/0147853 | A1* | 7/2006 | Lipp et al. ............... 431/8 |
| 2006/0242907 | A1* | 11/2006 | Sprouse et al. ............ 48/210 |
| 2009/0061370 | A1* | 3/2009 | Douglas .................. 431/131 |
| 2009/0173077 | A1* | 7/2009 | Lynch et al. ............... 60/771 |
| 2010/0170253 | A1* | 7/2010 | Berry et al. ............... 60/742 |
| 2010/0275604 | A1* | 11/2010 | Hall ........................ 60/748 |

OTHER PUBLICATIONS

3 Stream Injector Cold Flow Modeling Results, ChevronTexaco, Feb. 12, 2004, 5 pages.

Duane Brooker, et al., Feed Injector Nozzle Scale-Up Testing: Bete Fog Nozzle Inc., Apr. 4-16, 1994, 73 pages.

National Aeronautics and Space Adminstration, Liquid Rocket Engine Injectors, NASA Space Vehicle Design Criteria (Chemical Propulsion), Mar. 1976, 131 pages, NASA SP-8089, National Technical Information Services, Springfield, Virginia.

CN Office Action dated Aug. 2, 2013 from corresponding CN Application No. 201010260572.5.

* cited by examiner

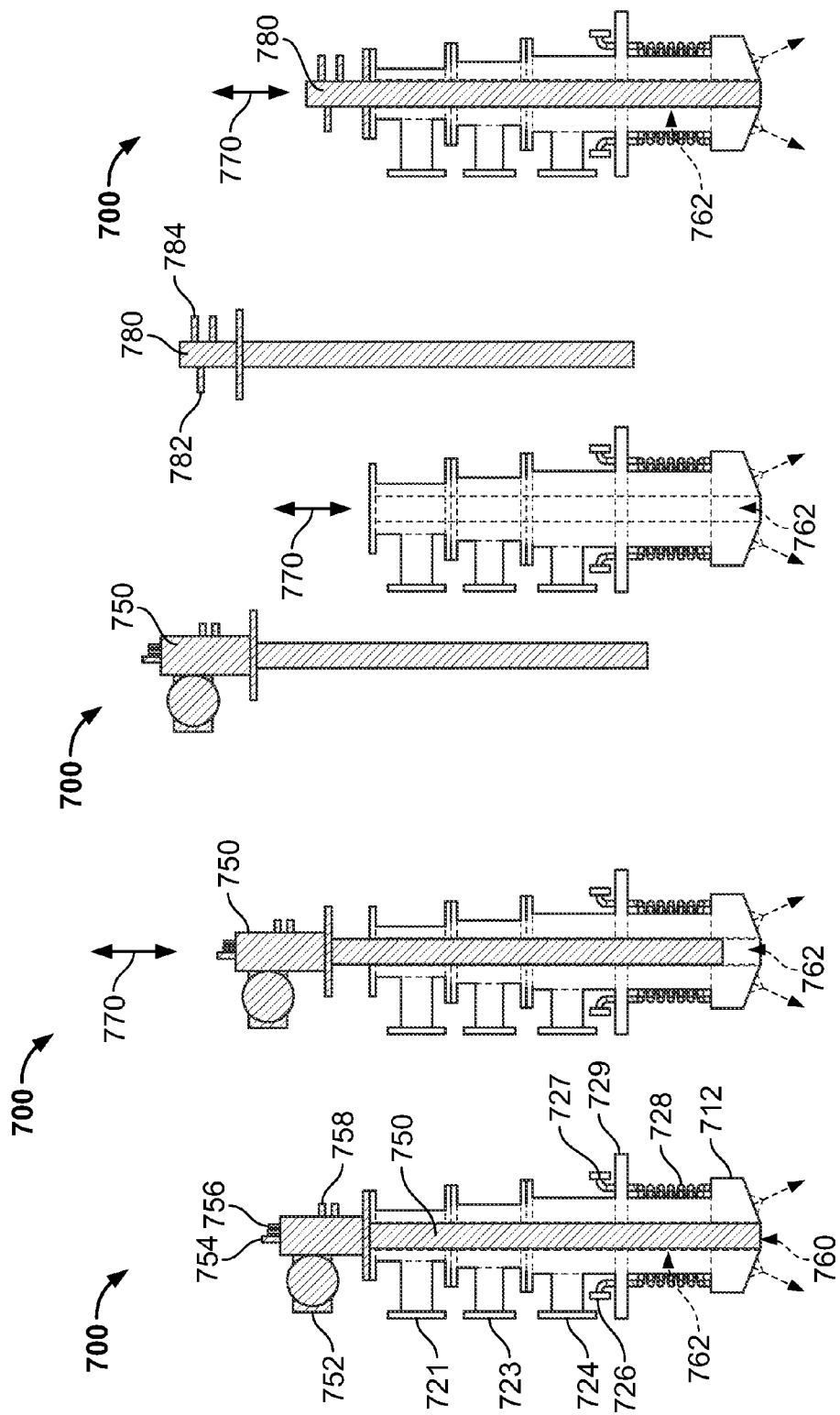

METHOD AND APPARATUS TO PRODUCE SYNTHETIC GAS

BACKGROUND OF THE INVENTION

The present invention relates generally to gasification systems, such as gasification systems used in an integrated gasification combined-cycle (IGCC) power generation plants, and more particularly, to methods and apparatus for optimizing synthetic gas production with a gasification system injection device.

Most known IGCC plants include a gasification system that is integrated with at least one power-producing turbine system. For example, known gasification systems convert a mixture of fuel, air or oxygen, liquid water, and/or steam, and/or $CO_2$ into a synthetic gas, or "syngas". The syngas is channeled to the combustor of a gas turbine engine, which powers a generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems associated with IGCC plants produce a syngas fuel by mixing a reactant stream, for example, oxygen, with a slurried carbonaceous material stream, for example, petroleum coke. At least one exothermic reaction is facilitated between the oxygen ($O_2$) and carbonaceous material that produces a syngas that includes hydrogen ($H_2$), carbon monoxide (CO) and carbon dioxide ($CO_2$). Petroleum coke typically has a relatively low hydrogen content in relation to its carbon content and heat content, thereby increasing gasifier temperatures. Moreover, gasification system components, for example, a gasification reactor refractory, may limit a temperature of reaction, and therefore limit an oxygen-to-carbon ratio, thereby limiting the use of carbon in forming CO and $CO_2$ as well as the associated heat release. The unused carbon is typically incorporated with a slag product, typically in the form of a char or soot, that is either recycled back into the reaction together with a portion of the slag, or is removed from the process with the slag as a waste by-product. The decreased oxygen-to-carbon ratio typically leads to an increased slag and char formation. The combined effect of the above may reduce the gasification system and IGCC plant efficiency with higher operating and capital costs.

BRIEF DESCRIPTION OF THE INVENTION

In one aspect, a method of producing a synthetic gas (syngas) is provided. The method includes injecting a plurality of reactant streams into a gasification reactor via at least one injection device having a plurality of injection annuli, an inner portion that extends annularly about a centerline extending through the at least one injection device, and an outer portion extending substantially annularly about the inner portion. At least a portion of the outer portion is oriented obliquely with respect to the at least one injection device centerline. The method also includes mixing at least a portion of each of the plurality of reactant streams together such that a plurality of recirculation zones is defined by the reactant streams. The method further includes producing a syngas within the plurality of recirculation zones via mixing at least a portion of each of the plurality of reactant streams.

In another aspect, an injection device is provided. The injection device includes an inner portion that extends annularly about a centerline extending through the injection device. The device also includes an outer portion extending substantially annularly about the inner portion that includes at least one of at least one carbonaceous reactant injection port oriented obliquely with respect to the injection device centerline and at least one outer face oriented obliquely with respect to the injection device centerline. The at least one carbonaceous reactant injection port is configured to at least partially define a plurality of recirculation zones at a predetermined distance from the injection device.

In a further aspect, a gasification system is provided. The gasification system includes at least one carbonaceous reactant source and at least one oxygenated reactant source. The system also includes at least one gasification reactor that includes at least one injection device coupled in flow communication with the at least one carbonaceous reactant source and the at least one oxygenated reactant source. The injection device includes an inner portion that extends annularly about a centerline extending through the injection device. The device also includes an outer portion extending substantially annularly about the inner portion that includes at least one of at least one carbonaceous reactant injection port oriented obliquely with respect to the injection device centerline and at least one outer face oriented obliquely with respect to the injection device centerline. The at least one carbonaceous reactant injection port is configured to at least partially define a plurality of recirculation zones at a predetermined distance from the injection device.

The method and apparatus for synthetic gas, or syngas, production as described herein facilitates operation of a gasification system. Specifically, injecting fluid streams into the gasification reactor at predetermined orientations increases syngas production efficiency. More specifically, configuring a plurality of reactant injection ports with predetermined dimensions facilitates forming small reactant droplets that are easily vaporized with improved atomization, thereby facilitating an increase of an efficiency and effectiveness of pyrolization and gasification of the reactants. The increased efficiency and effectiveness of pyrolization and gasification facilitates increasing a rate of production of syngas while decreasing a rate of production of ash and char by-products. Fabricating and operating the gasification reactor as described herein facilitates optimally operating the syngas production process to facilitate improving gasification system and IGCC plant production efficiency, thereby facilitating a reduction in capital and operating costs. Furthermore, the method and equipment for producing such syngas as described herein facilitates reducing capital costs associated with fabricating such IGCC plant.

BRIEF DESCRIPTION OF THE DRAWINGS

FIG. 14 is a schematic cross-sectional view of an alternative injector feed assembly that may be used with the gasification reactor shown in FIG. 2 with a flame lance fully inserted;

FIG. 15 is a schematic cross-sectional view of the alternative injector feed assembly shown in FIG. 14 with the flame lance partially extracted;

FIG. 16 is a schematic cross-sectional view of the alternative injector feed assembly shown in FIG. 15 with the flame lance fully extracted and an insert ready to be inserted;

FIG. 17 is a schematic cross-sectional view of the alternative injector feed assembly shown in FIG. 16 with the insert fully inserted;

DETAILED DESCRIPTION OF THE INVENTION

The method and apparatus for synthetic gas, or syngas, production as described herein facilitates operation of a gasification system, such as a gasification system integrated with a combined-cycle power generation plant, integrated gasification combined-cycle (IGCC) power generation plants, specifically, syngas production systems, and more specifically, gasification reactors. Specifically, injecting syngas production fluid streams into the gasification reactor at predetermined orientations increases syngas production efficiency. More specifically, forming substantially annular sheets of the reactant streams and intersecting them as described herein facilitates forming recirculation zones. Moreover, forming the recirculation zones facilitates increasing an effective residence time and/or residence time distribution of the reactants in relation to each other such that a greater efficiency and effectiveness of chemical reactions between the reactants occurs. Furthermore, configuring the reactant injection ports with predetermined injection angles facilitates forming small reactant droplets that are easily vaporized with improved atomization, thereby facilitating an increase of an efficiency and effectiveness of pyrolization and gasification of the reactants. The increased efficiency and effectiveness of pyrolization and gasification facilitates increasing a rate of production of syngas while decreasing a rate of production of ash and char by-products. Fabricating and operating the gasification reactor as described herein facilitates optimally operating the syngas production process to facilitate improving gasification system and IGCC plant production efficiency, thereby facilitating a reduction in capital and operating costs. Furthermore, the method and equipment for producing such syngas as described herein facilitates reducing capital costs associated with fabricating such IGCC plant.

Figure 1:
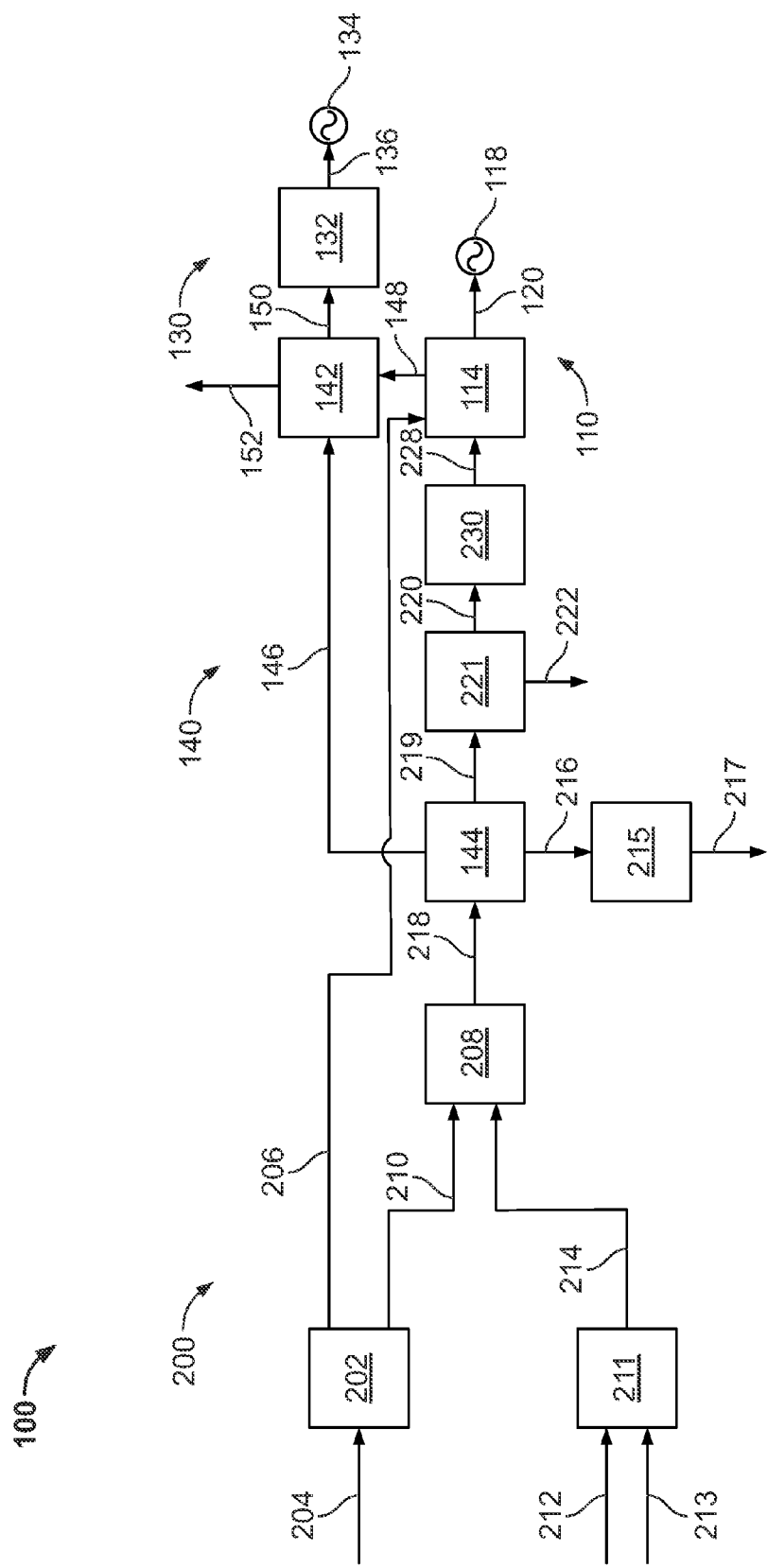
FIG. 1 is a schematic diagram of an exemplary integrated gasification combined-cycle (IGCC) power generation plant.

FIG. 1 is a schematic diagram of an exemplary gasification facility, specifically, an exemplary integrated gasification combined-cycle (IGCC) power generation plant 100. Alternatively, the method and apparatus to produce synthetic gas as described herein is used with any gasification facility in any configuration that that enables such method and apparatus. In the exemplary embodiment, IGCC plant includes a gas turbine engine 110. Turbine 114 is rotatably coupled to a first electrical generator 118 via a first rotor 120. Turbine 114 is coupled in flow communication with at least one fuel source and at least one air source (both described in more detail below) and is configured to receive the fuel and air from the fuel source and the air source (neither shown in FIG. 1), respectively. Turbine 114 mixes air and fuel, produces hot combustion gases (not shown), and converts the heat energy within the gases to rotational energy. The rotational energy is transmitted to generator 118 via rotor 120, wherein generator 118 converts the rotational energy to electrical energy (not shown) for transmission to at least one load, including, but not limited to, an electrical power grid (not shown).

IGCC plant 100 also includes a steam turbine engine 130. In the exemplary embodiment, engine 130 includes a steam turbine 132 rotatably coupled to a second electrical generator 134 via a second rotor 136.

IGCC plant 100 further includes a steam generation system 140. In the exemplary embodiment, system 140 includes at least one heat recovery steam generator (HRSG) 142 that receives exhaust gases (not shown) from turbine 114 via an exhaust gas conduit 148 that supplies heat used within HRSG 142 to produce one or more streams of steam from at least one boiler feedwater source that includes, but is not limited to, at least one heated boiler feedwater stream (not shown). HRSG 142 also is coupled in flow communication with at least one heat transfer apparatus 144 via at least one steam conduit 146. Apparatus 144 is also coupled in flow communication with at least one heated boiler feedwater conduit (not shown), wherein apparatus 144 receives heated boiler feedwater (not shown) from the same or a separate boiler feedwater source (not shown). HRSG 142 receives steam (not shown) from apparatus 144 via conduit 146, wherein HRSG 142 facilitates addition of heat energy to the steam. HRSG 142 is coupled in flow communication with turbine 132 via a steam conduit 150. In the exemplary embodiment, the cooled combustion gases are exhausted from HRSG 142 to the atmosphere via stack gas conduit 152. Alternatively, at least a portion of the excess combustion gases from HRSG 142 are channeled for use elsewhere in IGCC plant 100.

Conduit 150 is configured to channel steam (not shown) from HRSG 142 to turbine 132. Turbine 132 is configured to receive the steam from HRSG 142 and convert the thermal energy in the steam to rotational energy. The rotational energy is transmitted to generator 134 via rotor 136, wherein generator 134 is configured to facilitate converting the rotational energy to electrical energy (not shown) for transmission to at least one load, including, but not limited to, the electrical power grid. The steam is condensed and returned as boiler feedwater via a condensate conduit (not shown). Alternatively, at least a portion of the steam from HRSG 142, steam turbine 132 and/or heat transfer apparatus 144 is channeled for use elsewhere in IGCC plant 100.

IGCC plant 100 also includes a gasification system 200. In the exemplary embodiment, system 200 includes at least one air separation unit 202 coupled in flow communication with an air source via an air conduit 204. The air sources include, but are not limited to, dedicated air compressors (not shown) and a compressor (not shown) typically associated with gas turbine engine 110. Unit 202 is configured to separate air into one or more streams of oxygen ($O_2$), nitrogen ($N_2$) and other component streams (neither shown). The other component streams may be released via a vent (not shown) or collected in a storage unit (not shown). In the exemplary embodiment, at least a portion of $N_2$ is channeled to gas turbine 114 via a $N_2$ conduit to facilitate combustion.

System 200 includes a gasification reactor 208 that is coupled in flow communication with unit 202 and is configured to receive the $O_2$ channeled from unit 202 via an $O_2$ conduit 210. System 200 also includes a material grinding and slurrying unit 211. Unit 211 is coupled in flow communication with a carbonaceous material source and a water source (neither shown) via a carbonaceous material supply conduit 212 and a water supply conduit 213, respectively. In the exemplary embodiment, the carbonaceous material is petroleum coke, or pet coke. Moreover, in the exemplary embodiment, Unit 211 is configured to mix the pet coke and water to form a pet coke slurry stream (not shown) that is channeled to reactor 208 via a pet coke slurry conduit 214. Alternatively, any material that includes carbonaceous solids is used that facilitates operation of IGCC plant 100 as described herein. Also, alternatively, non-slurry fuels that include solid, liquid and gaseous fuel substances are used, including mixtures of fuels and other materials, such as but not limited to, fuel and slag additives.

Reactor 208 is configured to receive the material slurry stream and an $O_2$ stream via conduits 214 and 210, respectively. Reactor 208 is also configured to facilitate production of a hot, raw synthetic gas (syngas) stream (not shown). Moreover, reactor 208 is also configured to produce hot slag and char (both not shown) as a by-product of the syngas production.

Reactor 208 is coupled in flow communication with heat transfer apparatus 144 via a hot syngas conduit 218. Apparatus 144 is configured to receive the hot, raw syngas stream and transfer at least a portion of the heat to HRSG 142 via conduit 146. Subsequently, apparatus 144 produces a cooled, raw syngas stream (not shown) that is channeled to a scrubber and low temperature gas cooling (LTGC) unit 221 via a syngas conduit 219. Unit 221 is configured to remove the portion of slag and char entrained within the raw syngas stream (sometimes referred to as "fines") and facilitate removal of the fines via a fines conduit 222. The fines are sent to a waste collection system (not shown) for ultimate disposal and/or recirculated back into gasification reactor 208 to take advantage of unused carbon content within the fines. Unit 221 is also configured to further cool the raw syngas stream.

Apparatus 144 also facilitates removal of slag and char from the hot, raw syngas stream. Specifically, a slag and char handling unit 215 is coupled in flow communication with apparatus 144 via a hot slag conduit 216. Unit 215 is configured to quench the balance of the char and slag, simultaneously breaking up the slag into small pieces wherein a slag and char removal stream (not shown) is produced and channeled through conduit 217. In a manner similar to the fines discussed above, the slag and char are channeled to a waste collection subsystem (not shown) for ultimate disposal and/or recirculated back into gasification reactor 208 to take advantage of unused carbon within the slag and char.

System 200 further includes an acid gas removal subsystem 230 that is coupled in flow communication with unit 221 and is configured to receive the cooled raw syngas stream via a raw syngas conduit 220. Subsystem 230 is also configured to facilitate removal of at least a portion of acid components (not shown) from the raw syngas stream as discussed further below. Such acid gas components include, but are not limited to, $H_2S$ and $CO_2$. Subsystem 230 is further configured to facilitate separation of at least some of the acid gas components into components that include, but are not limited to, $H_2S$ and $CO_2$. In the exemplary embodiment, $CO_2$ is not recycled and/or sequestered. Alternatively, subsystem 230 is coupled in flow communication with reactor 208 via at least one $CO_2$ conduit (not shown) wherein a stream of $CO_2$ (not shown) is channeled to predetermined portions of reactor 208. The removal of such $CO_2$ and $H_2S$ via subsystem 230 facilitates producing a clean syngas stream (not shown) that is channeled to gas turbine 114 via a clean syngas conduit 228.

In operation, air separation unit 202 receives air via conduit 204. The air is separated into $O_2$, $N_2$ and other components. The other components are vented or collected, wherein at least a portion of $N_2$ is channeled to turbine 114 via conduit 206 and at least a portion of $O_2$ is channeled to gasification reactor 208 via conduit 210. Remaining portions of $N_2$ and $O_2$ may be channeled as a plurality of streams to other portions of IGCC 100 as needed, including, but not limited to, storage. Also, in operation, material grinding and slurrying unit 211 receives pet coke and water via conduits 212 and 213, respectively, forms a pet coke slurry stream and channels the pet coke slurry stream to reactor 208 via conduit 214.

Reactor 208 receives the $O_2$ via conduit 210, pet coke via conduit 214. Reactor 208 facilitates production of a hot raw syngas stream that is channeled to apparatus 144 via conduit 218. Some of the slag by-product that is formed in reactor 208 is removed via slag handling unit 215 and conduits 216 and 217. Apparatus 144 facilitates cooling the hot raw syngas stream to produce a cooled raw syngas stream that is channeled to scrubber and LTGC unit 221 via conduit 219 and the syngas is cooled further. Particulate matter, including some of the slag and char (in the form of fines), is removed from the syngas via conduit 222. The cool raw syngas stream is channeled to acid gas removal subsystem 230 wherein acid gas components are selectively removed such that a clean syngas stream is formed and channeled to gas turbine 114 via conduit 228.

Further, in operation, turbine 114 receives $N_2$ and clean syngas via conduits 206 and 228, respectively. Turbine 114 compresses air from at least one air source (not shown) that turbine 114 subsequently mixes and combusts with the syngas fuel, producing hot combustion gases. Turbine 114 channels the hot combustion gases to induce rotation of turbine 114 which subsequently rotates first generator 118 via rotor 120. At least a portion of the exhaust gases are channeled to HRSG 142 from turbine 114 via an exhaust gas conduit 148 to facilitate generating steam.

At least a portion of the heat removed from the hot syngas via heat transfer apparatus 144 is channeled to HRSG 142 as steam via conduit 146. HRSG 142 receives the steam from apparatus 144, together with one or more streams of boiler feed water, as well as the exhaust gases from turbine 114. Heat is transferred from the exhaust gases to the one or more streams of boiler feedwater as well as the steam from apparatus 144, thereby producing one or more subsequent streams of steam as well as increasing the heat energy contained in the steam from apparatus 144. In the exemplary embodiment, at least one of the streams of steam generated as described above is heated to superheated conditions. Alternatively, one or more of the aforementioned streams of steam are mixed together to form one or more mixed streams that may be heated to superheated conditions. Alternatively, high temperature saturated steam is formed. At least a portion of the superheated steam is channeled to steam turbine 132 via conduit 150 and induces a rotation of turbine 132. Turbine 132 rotates second generator 134 via second rotor 136. A remaining portion of the steam is channeled for use elsewhere within IGCC plant 100.

Figure 2:
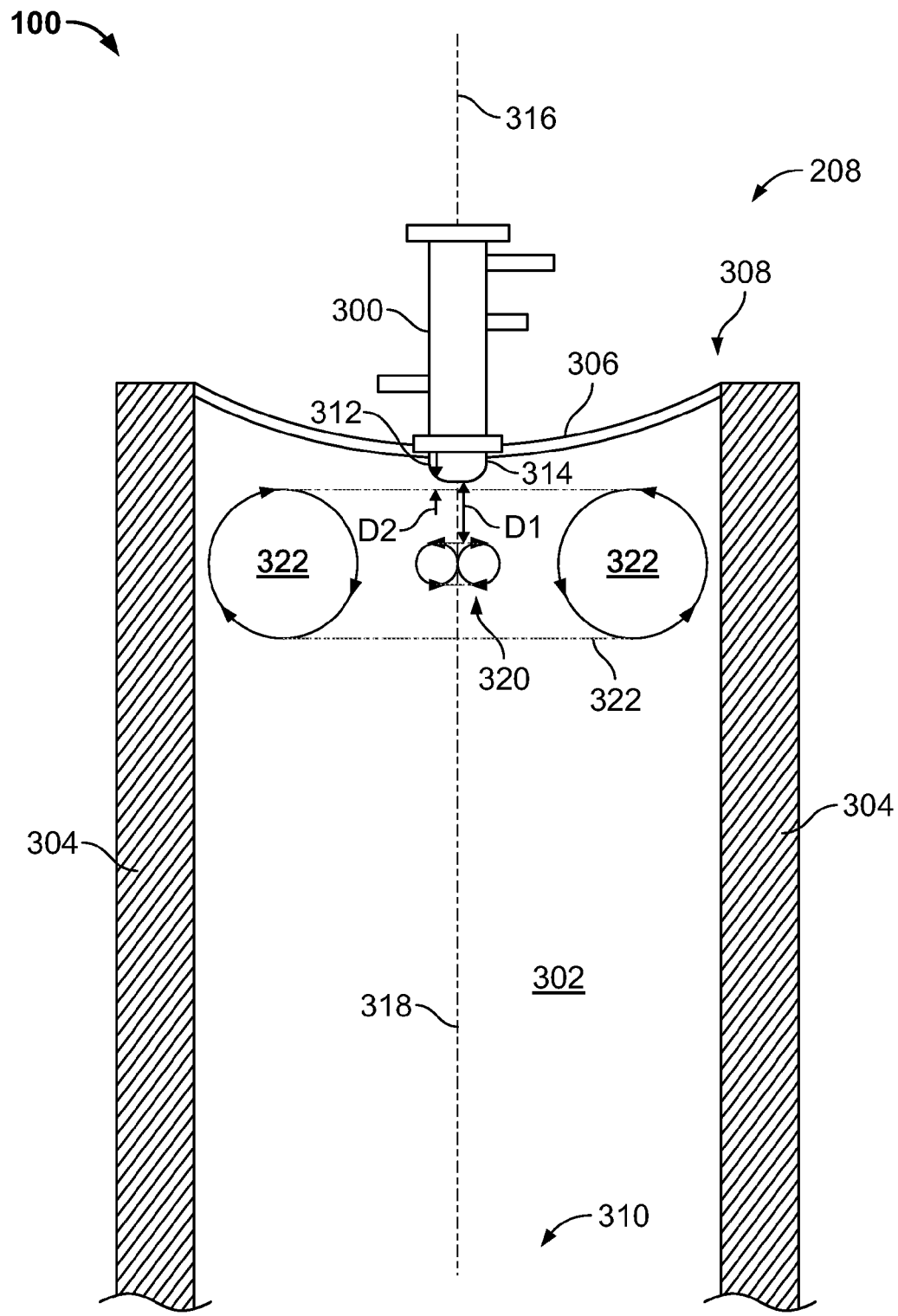
FIG. 2 is a schematic cross-sectional view of a gasification reactor that may be used for synthetic gas generation, such as may be used with the IGCC power generation plant shown in FIG. 1.

FIG. 2 is a schematic cross-sectional view of gasification reactor 208 that may be used for synthetic gas generation, such as may be used with IGCC power generation plant 100. Reactor 208 includes at least one injection device 300 that is coupled in flow communication with a gasification cavity 302. In the exemplary embodiment, device 300 is an annular triplet gasifier injector nozzle as described herein, thereby including three annular passages (described further below). Alternatively, device 300 is any injector nozzle that includes, but is not limited to, configurations with four or more annular passages. Further, alternatively, device 300 is any injector nozzle that includes, but is not limited to, three or more concentric passages, wherein each passage is coupled in flow communication with the annular passages described above in any configuration that facilitates operation of injection device 300 as described herein.

Cavity 302 is at least partially defined by a substantially cylindrical reactor wall 304 and a head end cover 306. In the exemplary embodiment, gasification reactor 208 is substantially cylindrical. Alternatively, reactor 208 includes any configuration that facilitates operation of reactor 208 as described herein. Also, in the exemplary embodiment, device 300 has a substantially vertical orientation (described further below) wherein device 300 penetrates the top of reactor 208 and points substantially downward. Alternatively, device 300 has any orientation including, but not limited to, substantially horizontal orientations.

In the exemplary embodiment, wall 304 includes at least one ceramic refractory material that includes, but is not limited to, heat tempered bricks. Alternatively, wall 304 is fluid-cooled, wherein the cooling fluids include, but are not limited to, nitrogen, water and/or steam. Cover 306 is sealingly coupled to at least a portion of a head end portion 308 of reactor 208. Cavity 302 is also partially defined by a tail end cover (not shown) that is sealingly coupled to at least a portion of wall 304, wherein the tail end cover is positioned on a tail end portion 310 that is in opposition to portion 308. Alternatively, cover 306, head end portion 308, the tail end cover and tail end portion 310 are oriented in any position relative to wall 304, including any orientation that facilitates operation of reactor 208 as described herein. Furthermore, wall 304 may be of any configuration that facilitates operation of reactor 208 as described herein. Moreover, alternatively, reactor 208 has any configuration that facilitates operation of IGCC 100 as described herein.

Injector device 300 includes a tip portion 312 that is inserted through an aperture 314 defined in head end cover 306 and sealingly coupled to head end cover 306 using a fastening method that includes, but is not limited to, retention hardware (not shown). Reactor 208 is configured such that an axial centerline 316 of injector device 300 is collinear with a longitudinal centerline 318 of gasification cavity 302. Tip portion 312 is configured to form a plurality of recirculation zones within cavity 302. Specifically, tip portion 312 is configured to form a first recirculation zone 320 a first distance $D_1$ from tip portion 312 within gasification cavity 302. Recirculation zone 320 has a shape that is substantially toroidal and the shape is one of substantially spatially continuous or partially segmented. Moreover, recirculation zone 320 is positioned close to and, with respect to centerline 318, substantially centered about centerline 318. Also, specifically, tip portion 312 is configured to form a second recirculation zone 322 a second distance $D_2$ from tip portion 312 within gasification cavity 302. Recirculation zone 322 has a shape that is substantially toroidal and the shape is one of substantially spatially continuous or partially segmented. Moreover, recirculation zone 322 is positioned with respect centerline 318, that is, substantially centered about centerline 318, and in close proximity to wall 304. First recirculation zone 320 is proximately centered within second recirculation zone 322.

Alternative embodiments of reactor 208 may include a plurality of injection devices 300, wherein each device 300 has a centerline 316, such that each associated centerline 316 is co-linear with a predefined axial orientation similar to centerline 318. Each of such plurality of devices 300 may have either a vertical, i.e., directly upward and/or directly downward, and/or a horizontal orientation, including any orientation between purely vertical and purely horizontal orientations, that facilitates operation of reactor 208 as described herein. Furthermore, such alternative embodiments of reactor 208 may include a plurality of devices 300, wherein all of devices 300 have a substantially similar orientation. Moreover, such alternative embodiments of reactor 208 may include a plurality of devices 300, wherein a first number of such injectors 300 have a differing orientation than a second number of such devices 300.

Still further alternative embodiments of reactor 208 may include a plurality of devices 300 wherein devices 300 are distributed across one or more surfaces of reactor 208, each device 300 with a differing orientation. Moreover, injectors 300 making up at least a portion of plurality of injectors 300 may each be placed in a dedicated cavity (not shown) that is a part of, or otherwise joined with, reactor 208, thereby facilitating separate formation or development of multiple recirculation zones from each such injector 300.

Figure 3:
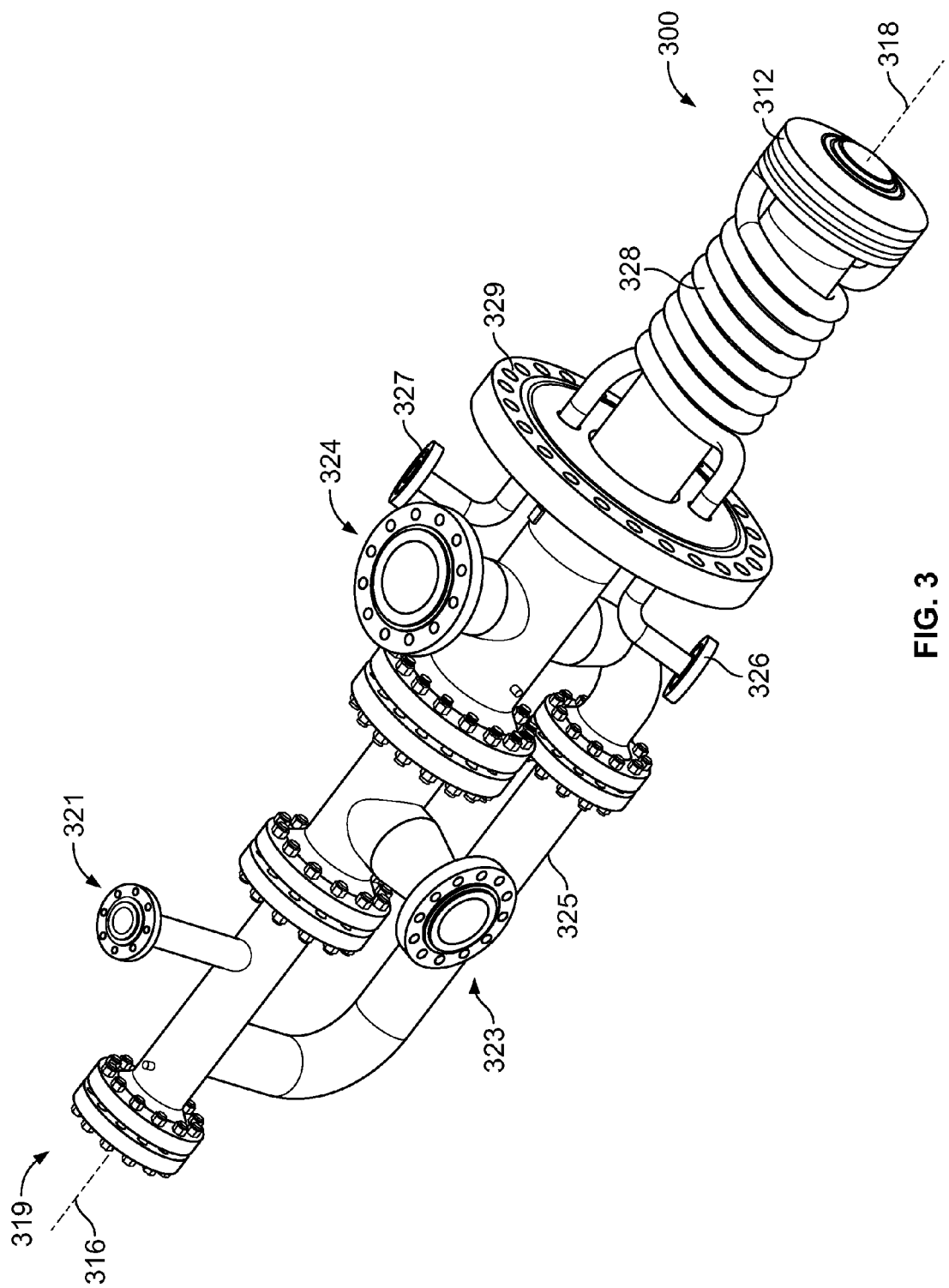
FIG. 3 is a schematic perspective view of an exemplary injector feed assembly that may be used with the gasification reactor shown in FIG. 2.

FIG. 3 is a schematic perspective view of an exemplary injector feed assembly 319 that may be used with gasification reactor 208 (shown in FIG. 2). Injection device axial centerline 316 and gasification cavity longitudinal centerline 318 are illustrated for perspective. Assembly 319 includes an inner oxygen ($O_2$) supply section 321 that is coupled in flow communication to an $O_2$ source similar to $O_2$ conduit 210 (shown in FIG. 1). Assembly 319 also includes a middle slurry section 323 that is coupled in flow communication to a slurry source similar to material slurry conduit 214 (shown in FIG. 1). Assembly 319 further includes an outer $O_2$ supply section 324 that is coupled in flow communication to an $O_2$ source similar to $O_2$ conduit 210. At least a portion of section 324 extends about at least a portion of section 323, at least a portion of section 323 extends about at least a portion of section 321, and, at least a portion of section 324 extends about at least a portion of section 321. Moreover, sections 321, 323, and 324 terminate where they join tip 312 in flow communication. Therefore, sections 321, 323 and 324 define a plurality of substantially concentric passages or channels, or, specifically, an inner $O_2$ channel, a middle slurry channel, and an outer $O_2$ channel (neither shown in FIG. 3) within assembly 319.

Assembly 319 also includes an $O_2$ bypass line 325 that establishes at least some flow communication between sections 324 and 321 such that a predetermined $O_2$ mass flow rate distribution is facilitated based at least partially upon cumulative predetermined $O_2$ pressure drops that occur as $O_2$ is channeled through sections 321 and 324, $O_2$ bypass line 325, and subsequent components as $O_2$ is discharged from assembly 319. Therefore, maintaining predetermined ratios of an outer $O_2$ mass flow rate and an inner $O_2$ mass flow rate (neither shown) are facilitated. Bypass line 325 facilitates installation and operation of assembly 319 in retrofits of gasification reactor 208. Alternatively, methods that include, but are not limited to flow orifices and manually-operated and automated throttle valves are used in conjunction with, or in lieu of, bypass line 325.

Assembly 319 further includes a cooling fluid inlet manifold 326 and a cooling fluid outlet manifold 327 coupled in flow communication with tip portion 312 of injection device 300 via a plurality of cooling fluid coils 328. Manifolds 326 and 327 and coils 328 facilitate channeling a cooling fluid to remove heat from tip portion 312 (discussed in more detail below). Assembly 319 also includes a mounting flange 329 that is removably and sealingly coupled to head end cover 306 using a fastening method that includes, but is not limited to, retention hardware (not shown). Alternatively, assembly 319 has any number of coolant connections and/or coolant flow means that facilitate operation of injection device 300 as described herein.

Figure 4:
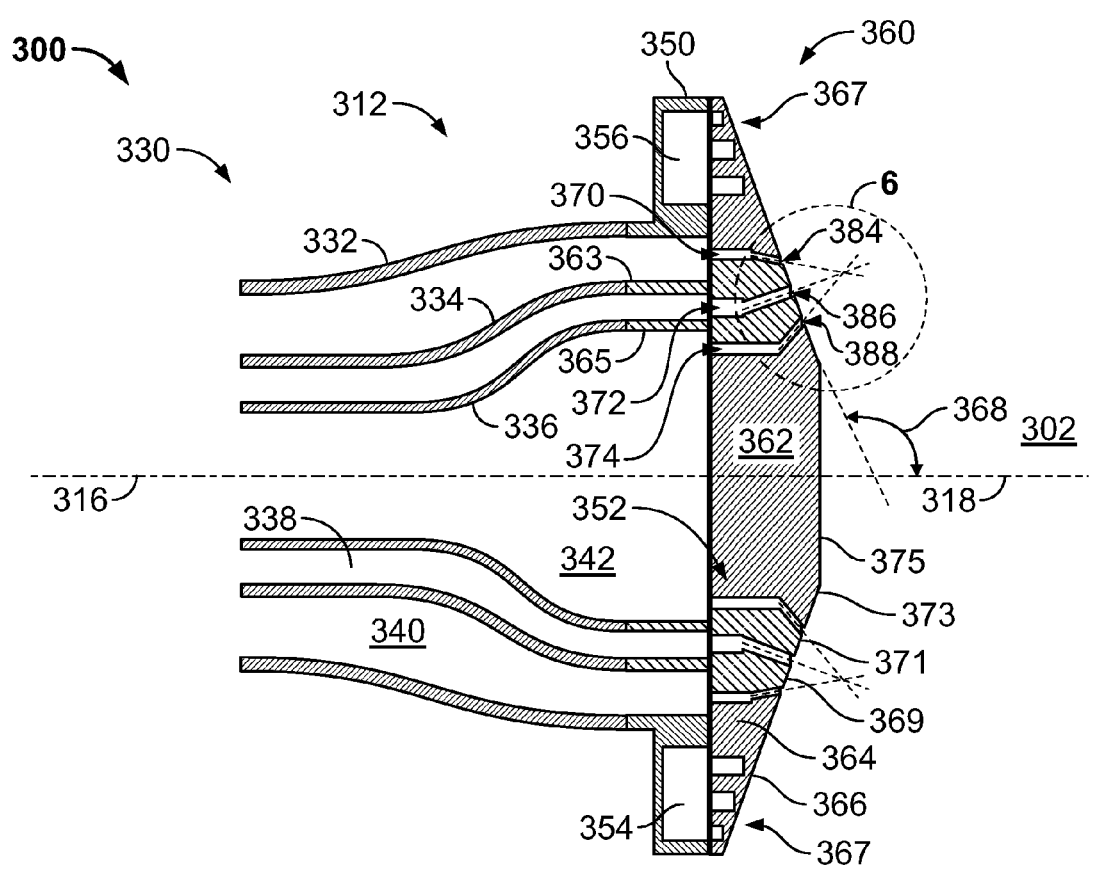
FIG. 4 is a schematic cross-sectional view of an injection device tip portion that may be used with the injector feed assembly shown in FIG. 3.
Figure 5:
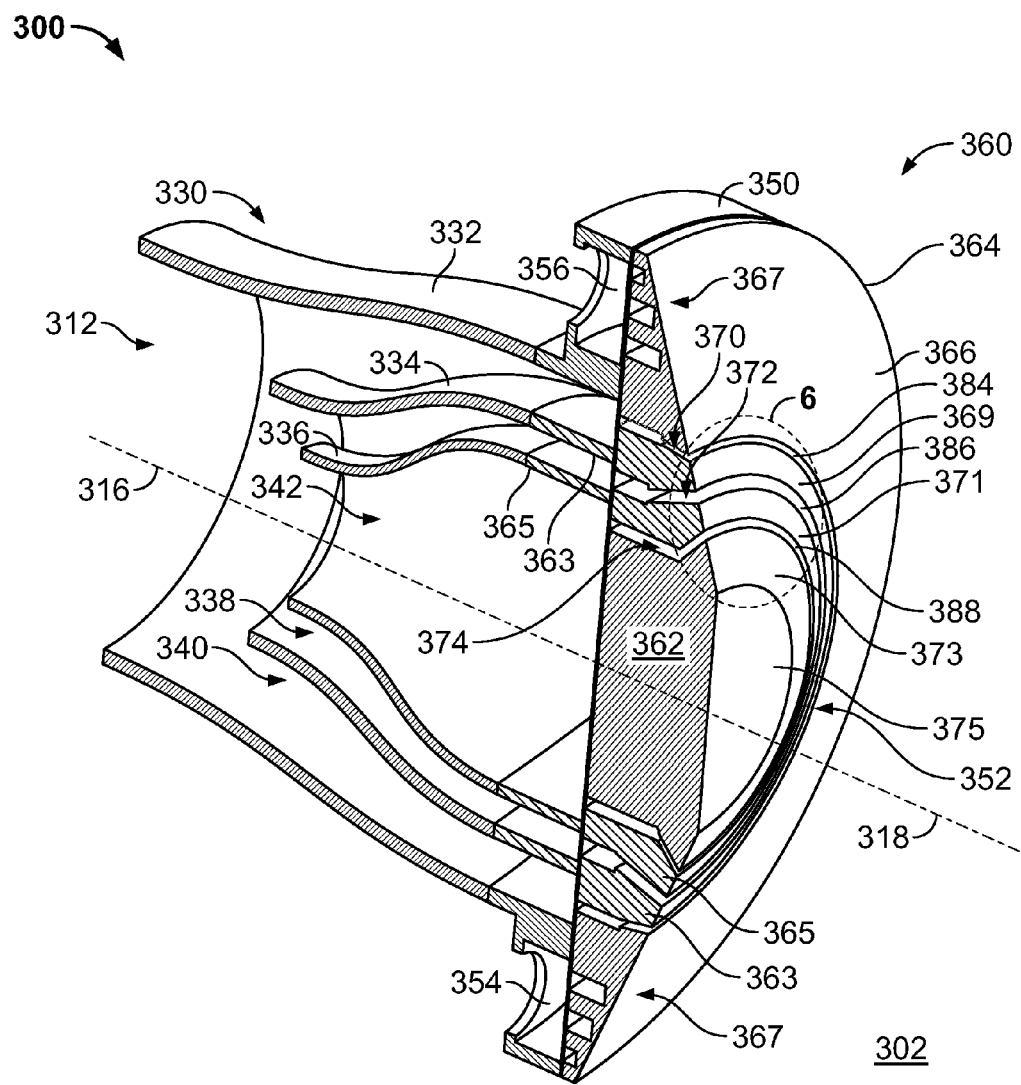
FIG. 5 is a schematic perspective cutaway view of the injection device tip portion shown in FIG. 4.

FIG. 4 is a schematic cross-sectional view of tip portion 312 of injection device 300 that may be used with injector feed assembly 319 (shown in FIG. 3). FIG. 5 is a schematic perspective cutaway view of tip portion 312 of injection device 300 (shown in FIG. 4). In the exemplary embodiment, tip portion 312 includes a piping transition portion 330 that includes three substantially concentric piping pieces. Specifically, portion 330 facilitates flow communication between assembly 319 and tip portion 312 and includes an at least partially cylindrical outer wall 332, an at least partially cylindrical intermediate wall 334, and an at least partially cylindrical inner wall 336. Wall 332 is coupled to portion 324 (shown in FIG. 3). Wall 334 is coupled to portion 323 (shown in FIG. 3). Wall 336 is coupled to portion 321 (shown in FIG. 3). Alternatively, portion 330 is an extension of assembly 319 instead of tip portion 312.

Intermediate wall 334 and inner wall 336 at least partially define an intermediate reactant passage, or slurry channel 338. Slurry channel 338 is coupled in flow communication with the intermediate coal slurry channel within assembly 319 (not shown). In the exemplary embodiment, intermediate wall 334 and outer wall 332 at least partially define an outer reactant passage, or gaseous oxygen (GOX) channel 340. GOX channel 340 has a substantially annular cross-section. Moreover, in the exemplary embodiment, inner wall 336 at least partially defines an inner reactant passage, or GOX channel 342. GOX channel 342 has a substantially circular cross-section. Inner GOX channel 342 and outer GOX channel 340 are coupled in flow communication with the inner and outer $O_2$ channels, respectively, (neither shown) within assembly 319. Alternatively, channels 340 and 342 are configured to channel any fluid that facilitates operation of tip portion 312 including, but not limited to, air, oxygen-enriched-air, steam, nitrogen and carbon dioxide and are coupled in flow communication with the appropriate fluid sources.

Tip portion 312 also includes an injector body adaptor 350 that is coupled to piping transition portion 330, and more specifically, outer wall 332, by one or more methods that include, but are not limited to, welding, brazing and other appropriate bonding techniques. Alternatively, retention hardware (not shown) is used. Adaptor 350 defines a cooling fluid inlet plenum 354 and a cooling fluid outlet plenum 356. Plenums 354 and 356 are coupled in flow communication with cooling fluid inlet manifold 326 and cooling fluid outlet manifold 327, respectively (both shown in FIG. 3). Moreover, in the exemplary embodiment, adaptor 350 includes flow channeling components (not shown) such that coolant flow channeling from and to plenums 354 and 356, respectively, is facilitated. Also, in the exemplary embodiment, adaptor 350 is formed from a plurality of adjoining components (not shown) in conjunction with a plurality of structural and alignment components (not shown) such that alignment and structural integrity of adaptor 350 and any adjacent components is facilitated. Alternatively, adaptor 350 is formed in any manner that facilitates operation of tip portion 312 as described herein.

Tip portion 312 further includes an injector body 360. In the exemplary embodiment, injector body 360 is formed from a plurality of adjacent components (discussed further below). Moreover, in the exemplary embodiment, injector body 360 includes flow channeling components (discussed further below) such that coolant flow channeling from and to plenums 354 and 356, respectively, is facilitated. Also, in the exemplary embodiment, injector body 360 is formed with a plurality of structural and alignment components (not shown) such that alignment and structural integrity of injector body 360 and any adjacent and/or adjoining components is facilitated. Alternatively, injector body 360 is formed in any manner that facilitates operation of tip portion 312 as described herein.

Specifically, in the exemplary embodiment, injector body 360 includes a center portion 362 that is substantially perpendicular to and centered with respect to centerline 316, that is, centered about injection device axial centerline 316 and substantially collinear gasification cavity longitudinal centerline 318. Center portion 362 is formed using methods that include, but are not limited to, casting and forging. Moreover, at least a portion of center portion 362 includes at least a portion of the plurality of structural and alignment components (not shown) discussed above. Injector body 360 also includes an outer annular portion 364. Injector body 362 further includes a radially outer intermediate portion 363 and a radially inner intermediate portion 365. Portions 363, 364, and 365 are each discussed further below.

Radially outer intermediate portion 363 is formed using methods that include, but are not limited to, casting and forging. Moreover, portion 363 is coupled to inner wall 334 by methods that include, but are not limited to, welding, brazing and other appropriate bonding techniques. Alternatively, retention hardware (not shown) is used.

Outer annular portion 364 is formed using methods that include, but are not limited to, casting and forging. Moreover, portion 364 is coupled to adaptor 350 by methods that include, but are not limited to, welding, brazing and other appropriate bonding techniques. Alternatively, retention hardware (not shown) is used.

Radially inner intermediate portion 365 is formed using methods that include, but are not limited to, casting and forging. Moreover, portion 365 is coupled to intermediate wall 336 by methods that include, but are not limited to, welding, brazing and other appropriate bonding techniques. Alternatively, retention hardware (not shown) is used.

In the exemplary embodiment, portions 362, 363, 364, and 365 are formed separately and are assembled within tip portion 312 to form injector body 360. Alternatively, injector body 360 is integrally formed as a single piece. Also, alternatively, portions 362, 363, 364, and 365 may be integrally formed with each other in any combination that facilitates operation of injector body 360 as described herein.

Outer annular portion 364 forms a first radially outer face 366. Radially outer intermediate portion 363 forms a second radially outer face 369. Radially inner intermediate portion 365 forms a third radially outer face 371. Center portion 362 forms a fourth radially outer face 373. In the exemplary embodiment, faces 366, 369, 371, and 373 are substantially flush with each other and are configured with an oblique, or more specifically, an obtuse angle 368 with respect to centerlines 316 and 318. That is, first radially outer face 366 is oriented at oblique angle 368 with respect to centerline 316, that is, substantially centered about the injection device axial centerline 316. Center portion 362 also forms an axially outer surface 375 that is, in the exemplary embodiment, oriented with respect to centerline 316, that is, oriented substantially perpendicular to and substantially centered about injection device axial centerline 316. Alternatively, faces 366, 369, 371, and 373 and surface 375 have any shape, orientation, and configuration that facilitates operation of injector body 360 as described herein.

In the exemplary embodiment, portion 363 having face 369 is a unitary piece. Alternatively, portion 363 includes two pieces (not shown), wherein an axially inner first piece (not shown) is coupled to wall 334, an axially outer second piece having face 369 is coupled to portion 364 and/or portion 365 by methods that include, but are not limited to, cooling spokes and structural supports (neither shown), and the first and second pieces are coupled to each other by methods that include, but are not limited to, welding, brazing and other appropriate bonding techniques. Alternatively, retention hardware (not shown) is used.

Also, in the exemplary embodiment, portion 365 having face 371 is a unitary piece. Alternatively, portion 365 includes two pieces (not shown), wherein an axially inner first piece (not shown) is coupled to wall 336, an axially outer second piece having face 371 is coupled to portion 362 and/or portion 363 by methods that include, but are not limited to, cooling spokes and structural supports (neither shown), and the first and second pieces are coupled to each other by methods that include, but are not limited to, welding, brazing and other appropriate bonding techniques. Alternatively, retention hardware (not shown) is used.

Further, in the exemplary embodiment, angle 368 is approximately 100° to 120° with the preferred range being 105° to 115°. Alternatively, angle 368 is any value that facilitates operation of injection device 300 as described herein.

Moreover, in the exemplary embodiment, at least one of portions 362, 363, 364, and 365, including faces 366, 369, 371 and 373 and surface 375, are fluid-cooled. Such fluid-cooling is performed with at least one of circuit fluid cooling and/or process fluid cooling. Circuit fluid cooling is performed with a closed cooling fluid circuit and is discussed further below. Such process fluid cooling is accomplished with process fluids that include, but are not limited to, fuels and oxidants. Also, in the exemplary embodiment, no refractory coating is formed over faces 366, 369, 371, and 373 and surface 375. Alternatively, at least one layer of refractory coating is formed over at least a portion of at least one of faces 366, 369, 371, and 373 and surface 375. Alternatively, any combination of fluid cooling and refractory coating is used that facilitates operation of injector body 360 as described herein. Further, alternatively, injector body 360 includes no fluid cooling and no refractory coating and is at least partially formed of one or more heat-resistant materials including, but not limited to, at least one refractory material.

In the exemplary embodiment, such circuit fluid cooling as discussed above is facilitated by a plurality of circumferential cooling channels 367 defined within injector body 360. Specifically, channels 367 are defined within portion 364 and are coupled in flow communication with inlet and outlet plenums 354 and 356, respectively. Moreover, in the exemplary embodiment, three channels 367 are defined within portion 364. Further, a number of circumferential cooling channels (not shown) are defined within portion 362 in a similar manner. Alternatively, any number of cooling channels are defined in any portion of injector body 360 in any orientation and configuration that facilitates operation of tip portion 312 as described herein. Cooling of injector body 360 is discussed further below.

In the exemplary embodiment portions 362, 363, 364, and 365 cooperate to form a plurality of reactant injection annuli 352. Specifically, portions 364 and 363 cooperate to define an outer GOX injection annulus 370 and an associated annular outer GOX injection port 384 that are coupled in flow communication with outer GOX channel 340. Also, specifically, portions 363 and 365 cooperate to define a carbonaceous reactant annulus, or more specifically, a slurry injection annulus 372 and an associated carbonaceous reactant port, or more specifically, annular slurry injection port 386 that are coupled in flow communication with slurry channel 338. Further, specifically, portion 365 and 362 cooperate to define an annular inner GOX injection annulus 374 and an inner GOX injection port 388 that are coupled in flow communication with inner GOX channel 342. Alternatively, any number of reactant injection channels and injection ports are defined within injector body 360 that facilitate operation of tip portion 312 as described herein. In the exemplary embodiment, annuli 370, 372 and 374 and associated concentric injection ports 384, 386, and 388 are continuous as defined at faces 366, 369, 371, and 373. Alternative embodiments are discussed below. Area 6 shown in FIGS. 4 and 5 is discussed further below.

Figure 6:
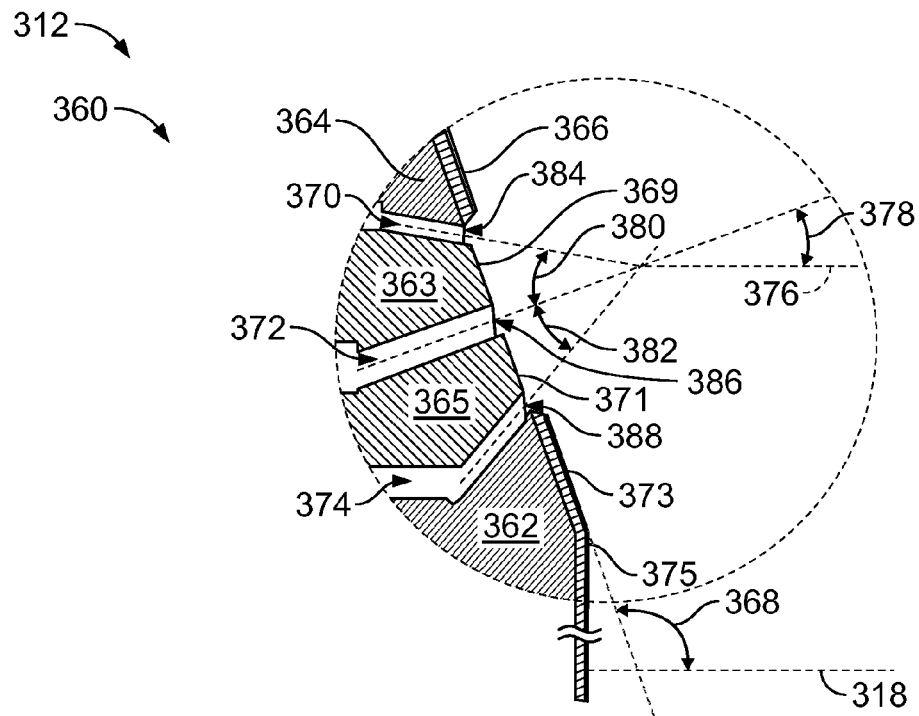
FIG. 6 is a schematic cross-sectional view of a portion of the injection device tip portion shown in FIGS. 4 and 5 taken along area 6.

FIG. 6 is a schematic cross-sectional view of a portion of tip portion 312 taken along area 6 (shown in shown in FIGS. 4 and 5). Line 376 is illustrated for perspective and is substantially parallel to centerlines 316 (shown in FIGS. 2, 3, 4, and 5) and 318. Slurry injection annulus 372 and slurry injection port 386 are configured to discharge, or inject a slurry stream (not shown in FIG. 6) at an angle 378 with respect to line 376. That is, slurry injection annulus 372 and slurry injection port 386 are oriented at an oblique angle with respect to centerline 316, that is, substantially centered about injection device axial centerline 316. Also, outer GOX injection annulus 370 and outer GOX injection port 384 are configured to discharge, or inject an outer GOX stream (not shown in FIG. 6) at an angle 380 with respect to the slurry stream such that the outer GOX stream intersects the slurry stream at approximately angle 380. Furthermore, inner GOX injection annulus 374 and inner GOX injection port 388 are configured to discharge, or inject an inner GOX stream (not shown in FIG. 6) at an angle 382 with respect to the slurry stream such that the inner GOX stream intersects the slurry stream at approximately angle 382 and the outer GOX stream at approximately a sum of angle 380 and angle 382. Such intersection of the three streams occurs at a predetermined distance from tip portion 312 and at a predetermined distance radially outward from gasification reactor centerline 318.

In the exemplary embodiment, angle 378 is greater than 0°, or more specifically, approximately 5° to 30° degrees and the preferred range is approximately 15° to 20°. Also, in the exemplary embodiment, angle 380 is approximately 20° to 70° and the preferred range is approximately 30° to 60°. Furthermore, in the exemplary embodiment, angle 382 is approximately 20° to 70° and the preferred range is approximately 30° to 60°. Alternatively, angles 378, 380, and 382 are any value that facilitates operation of tip portion 312 as described herein. For example, such values for angles 378, 380, and 382 are at least partially based on configuration parameters that include, but are not limited to, dimensions of annuli 370, 372, and/or 374 as well as associated injection ports 384, 386, and/or 388, respectively, as compared to dimensions of gasification cavity 302, including, but not limited to, a diametrical distance (not shown) between walls 304 (shown in FIG. 2), wherein such diametrical distance is substantially orthogonal to centerline 318.

Configuring injection annuli 370, 372, and 374 (including configuring ports 384, 386, and 388, respectively) to facilitate intersection of the slurry and GOX streams (neither shown in FIG. 6) at predetermined angles with predetermined momentums facilitates mixing of the reactant streams and improving an efficiency of chemical reactions between the slurry and oxygen. Specifically, configuring injection annulus 372 to facilitate discharging, or injecting the slurry stream at angle 378 away from centerlines 316 and 318 facilitates improving a residence time of the coal particles from the slurry. Also, specifically, configuring injection annulus 370 to facilitate discharging, or injecting the outer GOX stream at angle 380 towards the slurry stream and towards line 376 (that is substantially parallel to centerline 318), and configuring injection annulus 374 to facilitate discharging, or injecting the inner GOX stream at an angle 382 toward the slurry stream and towards line 376 facilitates forming recirculation zones 320 and 322 (both shown in FIG. 2) about line 318. Further, specifically, angle 378 is predetermined to facilitate discharging, or injecting the slurry stream such that both recirculation zones 320 and 322 are formed about centerline 318. Mixing the slurry stream and GOX streams in this manner helps facilitate the use of the kinetic energy in the streams in the atomization of the slurry and mixing of the atomized slurry with the GOX. The two recirculation zones 320 and 322 thereby formed also help improve the effective residence time distribution of the fuel and GOX mixture and rapidly expose the slurry droplets to high temperatures, thereby facilitating vaporization and heating of the slurry. Moreover, angle 378 is also sized to mitigate a potential of void formation within the slurry stream entering cavity 302 before the slurry stream has had sufficient opportunity to mix and react with the oxygen. Such void formation mitigation within the slurry stream about centerline 318 facilitates dispersion uniformity by reducing variations in the GOX-to-fuel ratio. Such mechanisms facilitate forming localized high temperatures, that is, above slagging conditions, and increasing an effective distribution of the residence time between the reactants.

Therefore, orienting and configuring injection annuli 370, 372, and 374 and angles 378, 380, and 382 as discussed herein facilitates vaporization of reactant, that is, slurry, droplets. Specifically, recirculation zones 320 and 322 facilitate increasing the effective residence time distribution of the slurry and GOX such that reactions between the carbonaceous material and GOX occur more completely. Moreover, forming such recirculation zones 320 and 322 in the vicinity of head end portion 308 (shown in FIG. 2) facilitates a rate of heat release in that vicinity that subsequently facilitates vaporization of water and heating of fuel in the slurry stream. Alternatively, angles 378, 380 and 382 are configured to position recirculation zones 320 and 322 in predetermined regions of cavity 302 that position first zone 320 closer to and/or further away from wall 304 and/or second zone 322 closer to and/or further away centerline 318. Also, alternatively, in general, angles 378, 380 and 382 may be increased such that a point of intersection of the associated sheets moves axially toward portion 364 if refractory loss, such as, but not limited to, spallation, and heat retention by tip 312 are not an issue.

Figure 7:
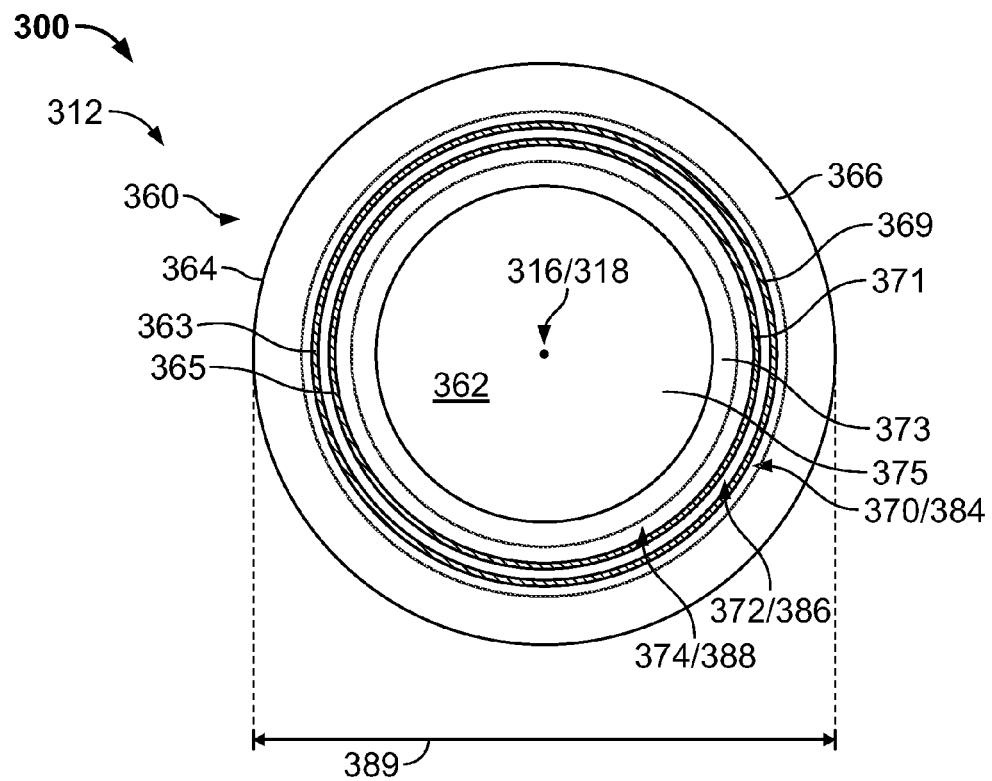
FIG. 7 is a schematic front view of the injection device tip portion shown in FIGS. 4 and 5.

FIG. 7 is a schematic front view of injection device tip portion 312, specifically injector body 360. Centerlines 316 and 318 are illustrated for perspective. In the exemplary embodiment, injector body 360 has an external diameter 389 that is any value that facilitates operation of injection device 300 as described herein. Also, in the exemplary embodiment, annuli 370, 372 and 374, including ports 384, 386, and 388, respectively, are defined and configured to facilitate forming substantially annularly diverging and annularly converging sheets (not shown in FIG. 7) via injection of the associated streams. Alternatively, any number and any configuration of injection annuli 370, 372 and 374 are used to discharge, or inject the associated streams in any stream configuration that facilitates operation of injection device tip portion 312 as described herein.

Figure 8:
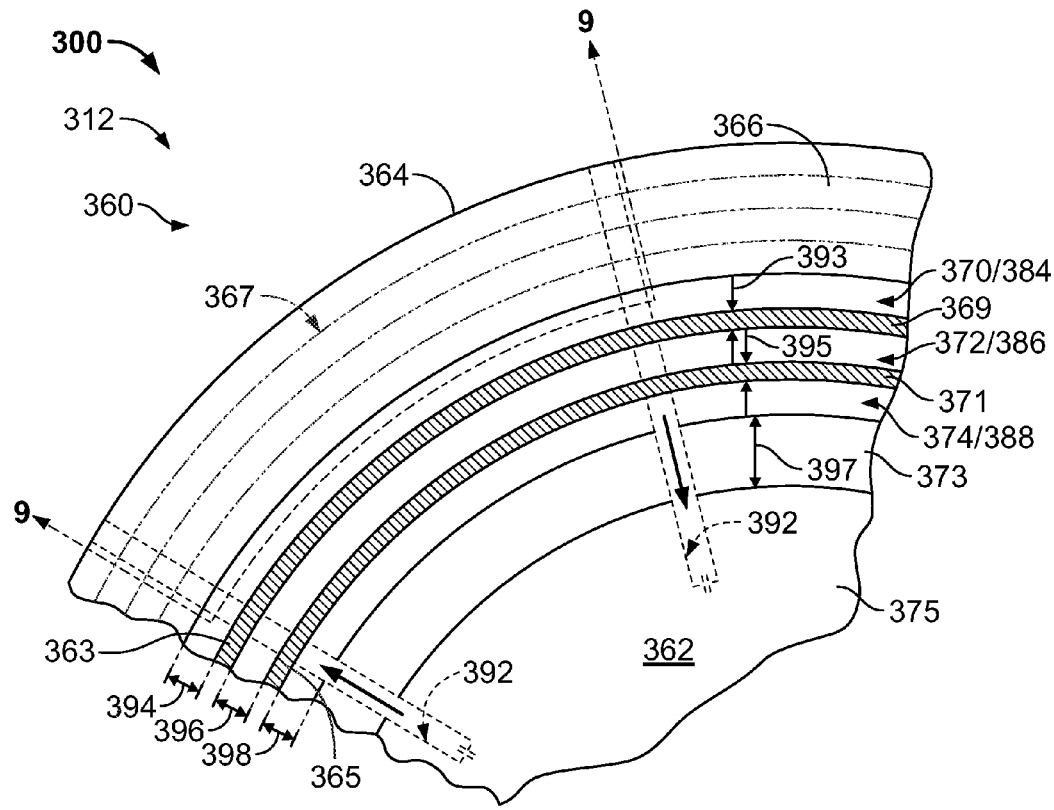
FIG. 8 is a schematic front view of a portion of the injection device tip portion shown in FIG. 7.

FIG. 8 is a schematic front view of a portion of injection device tip portion 312. Portion 312 includes a plurality of coolant channels 392 that cooperate with coolant inlet plenum 354 and coolant outlet plenum 356 (both shown in FIGS. 4 and 5) as well as channels 367 via standard channeling means (not shown) including, but not limited to, center portion cooling channels (not shown). In the exemplary embodiment, alternating channels 392 are configured to channel a coolant radially inward and outward within tip portion 312 (as indicated by the solid arrows) to facilitate cooling tip portion 312, or, specifically, cooling center portion 362, including fourth radially outer face 373 and axially outer surface 375, respectively, and cooling outer annular portion 364, including first radially outer face 366. Alternatively, cooling radially outer and inner portions 363 and 365, respectively, including faces 369 and 371, respectively, also is facilitated by channels 392. Also, alternatively, any number of and any configuration of coolant channeling means, including, but not limited to, predefined channels and plenums within at least one cooling circuit (not shown) that facilitates operation of tip portion 312 as described herein is used. Still, further alternatively, structural support and alignment components, including, but not limited to, support rods, cooperate with channels 392, or, in lieu of channels 392 (for those embodiments without cooling channels 392). In the exemplary embodiment, the coolant is water. Alternatively, the coolant includes, but is not limited to, steam. Further, alternatively, any coolant may be used that facilitates cooling and operation of tip portion 312 as described herein.

Slag adherence can occur whenever a temperature of tip portion 312 is above a slag sticking temperature, for example, above approximately 871 degrees Celsius (° C.) (1600 degrees Fahrenheit (° F.)). Therefore, in the exemplary embodiment, plenums 354 and 356, and channels 367 and 392 are configured to facilitate maintaining a temperature of portions of tip portion 312, including, but not limited to, face 366 and surface 375 within a range of approximately 204° C. (400° F.) to 649° C. (1200° F.), preferably within a range of 232° C. (450° F.) to 399° C. (750° F.). Alternatively, face 366 and surface 375 have any configuration and/or orientation that facilitates cooling of face 366 and surface 375 and facilitates operation of tip 312 as described herein.

Each of injection ports 384, 386, and 388 includes a radial dimension 394, 396 and 398, respectively. Dimension 396, and the associated cross-sectional area of injection port 386, are sized to facilitate discharging, or injecting a thin slurry stream (not shown) through annulus 372 and injection port 386. Dimension 396, and the associated cross-sectional area of injection port 386, are oriented perpendicular to the thin slurry stream transiting through port 384. The thin slurry stream subsequently forms a thin sheet of slurry that is readily broken up into small reactant droplets that are easily vaporized, i.e., improving slurry atomization, thereby facilitating an increase of an efficiency and effectiveness of pyrolization and gasification of the organic materials in the slurry. Such increase in efficiency and effectiveness of pyrolization and gasification facilitates increasing a rate of production of syngas while decreasing a rate of production of ash by-products (neither shown). In the exemplary embodiment, dimension 396 has any value that facilitates operation of tip portion 312 as described herein.

Dimensions 394 and 398, and the associated cross-sectional areas, are perpendicular to flows of outer and inner GOX streams, respectively, discharging from ports 384 and 388, respectively, and are independently sized to facilitate mixing of the outer and inner GOX streams with the slurry stream, thereby facilitating an increase of an efficiency and effectiveness of pyrolization and gasification of the organic materials in the slurry. For example, methods of determining dimensions 394 and 398 include, but are not limited to, formulations of standard oxidant-to-fuel ratios and Reynolds, Weber, and Ohnesorge numbers as are known in the art. In the exemplary embodiment, dimensions 394 and 398, and the associated cross-sectional areas, are sized to facilitate distribution of GOX flow rates that produce adiabatic gasification temperatures within a range of approximately 1177° C. to 1482° C. (2150° F. to 2700° F.). Arc 9-9 illustrates a portion of tip portion 312 from a radial perspective.

Each of outer faces 369, 371, and 373 includes a radial dimension 393, 395, and 397, respectively. As discussed further below, dimensions 393, 395, and 397 are predetermined to facilitate cooperation with other parameters that include, but are not limited to, dimensions 394, 396, and 398 to facilitate mixing of the inner and outer GOX streams with the slurry stream, thereby facilitating an increase of an efficiency and effectiveness of pyrolization and gasification of the organic materials in the slurry.

Figure 9:
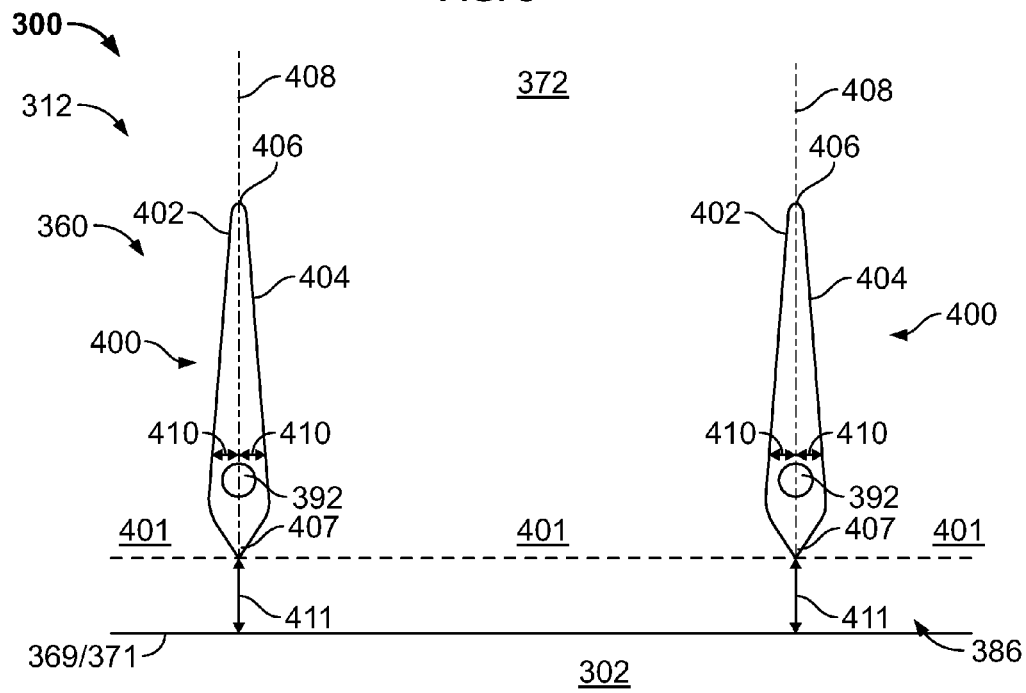
FIG. 9 is a schematic radial perspective view of a portion of the injection device tip portion shown in FIG. 8 taken along arc 9-9.

FIG. 9 is a schematic radial perspective view of a portion of injection device tip portion 312 taken along arc 9-9 (shown in FIG. 8). Specifically, a plurality of flow splitters 400 are positioned within injector body 360 to facilitate separation and subsequent recombination of the slurry around channels 392, thereby protecting channels 392 and/or any mechanical support devices and structural members, including, but not limited to, rods and spacers (neither shown) extending through annulus 372, from slurry-induced erosion. Flow splitters 400 thus separate an axially inner portion of slurry injection annulus 372 just upstream of injection port 386 into a plurality of slurry slots, or channels 401, thereby at least partially defining annulus 372. Each flow splitter 400 includes a first side 402 and an opposing second side 404 that at least partially defines channels 401. Coal slurries typically do not behave as Newtonian fluids. In contrast, coal slurries typically behave in a manner similar to Bingham plastics. Specifically, instead of having a viscosity value, coal slurries are more readily characterized by a yield stress and a coefficient of rigidity. Therefore, any time a shear stress at a wall of a slurry passage, for example, first side 402 and second side 404 of channels 401, is less than the yield stress of the slurry, flow pluggage within channels 401 will be facilitated wherein slurry flow will be decreased up to complete stoppage.

Each of flow splitters 400 also includes an upstream apex 406 that is at least partially defined by a conjunction of sides 402 and 404. Each upstream apex 406 is substantially aligned with a line 408, wherein line 408 is substantially aligned with angle 378 (as shown in FIG. 6) and substantially bifurcates splitter 400 including bisecting each apex 406 into two substantially congruent angles 410. Angles 410 facilitate diverging at least a portion of slurry flow received from slurry channel 338 (shown in FIG. 4) into adjacent channels 401 such that the abrasive nature and flow plugging characteristics of the coal particles in the slurry are mitigated. In the exemplary embodiment, angles 410 have a value of approximately 3° to approximately 15°. Alternatively, angles 410 have any value that facilitates operation of tip portion 312 as described herein.

Each of flow splitters 400 further include a downstream apex 407 that is at least partially defined by a conjunction of sides 402 and 404. In the exemplary embodiment, apex 406 is slightly rounded to facilitate flow splitting and apex 407 is substantially pointed to facilitate recombination of the flow streams within annulus 372 downstream of flow splitters 400. Alternatively, apex 406 and apex 407 have any shape to facilitate operation of tip portion 312 as described herein.

In the exemplary embodiment, channels 392 and/or any rods, spacers, or other structural support members, as well as flow splitters 400 and slurry channels 401 are recessed within annulus 372 a predetermined axial distance 411 axially upstream of faces 369 and/or 371. Distance 411 and the shape of apex 407 are predetermined based on the recombinant characteristics of the slurry stream exiting injection port 386 into gasification cavity 302. Alternatively, channels 392 and/ or any rods, spacers, or other structural support members, as well as flow splitters 400 are positioned within annulus 372 having any orientation with respect to faces 369 and/or 371 that facilitates operation of injection device 300 as described herein.

Also, in the exemplary embodiment, annuli 370 and 374 (shown in FIG. 8) include a plurality of flow splitters 400 to facilitate separation of reactant flow via apex 406 and subsequent recombination of reactant flow downstream of apex 407. Such flow splitting facilitates protection of channels 392 and/or any rods, spacers, or other structural support members extending through annuli 370 and/or 374, from reactant flow-induced erosion. However, the angles of the associated upstream and downstream apexes (neither shown) have values that facilitate predetermined reactant fluid flow characteristics associated with the particular reactant fluid.

Further, in the exemplary embodiment, flow splitters 400 are formed about or attached to channels 392 and/or rods, or other structural members using standard methods of mechanical coupling. In an alternative embodiment, flow splitters 400 are an integral part of channels 392, and/or rods, and/or any other structural members extending through one or more annuli 370, 372 and 374. Further, in an alternative embodiment, flow splitters 400 are used instead of rods or other structural members to facilitate structural integrity and/ or alignment of one or more annuli 370, 372, and 374 and associated injection ports 384, 386, and 388, respectively. Still further, alternatively, at least one of flow splitters 400 is an integral part of at least one of tip portion 364, 363, 365, and/or 362.

Alternatively, portions of radially inner portion 365, including face 371, and portions of radially outer portion 363, including face 369, are cooled using coolant transported through a separate cooling water circuit (not shown) that includes at least one coolant inlet and at least one coolant outlet (neither shown). Further, alternatively, the portions of radially inner portion 365, including face 371, and portions of radially outer portion 363, including face 369, are cooled by any means that facilitates operation of the injector tip 300 as described herein. Also, alternatively, if center portion 362 is not cooled or center portion 362 is cooled via a separate cooling source (not shown) other than via channels 392, channels 392 are replaced with structural members to facilitate structural integrity and/or alignment of tip portion 312.

Figure 10:
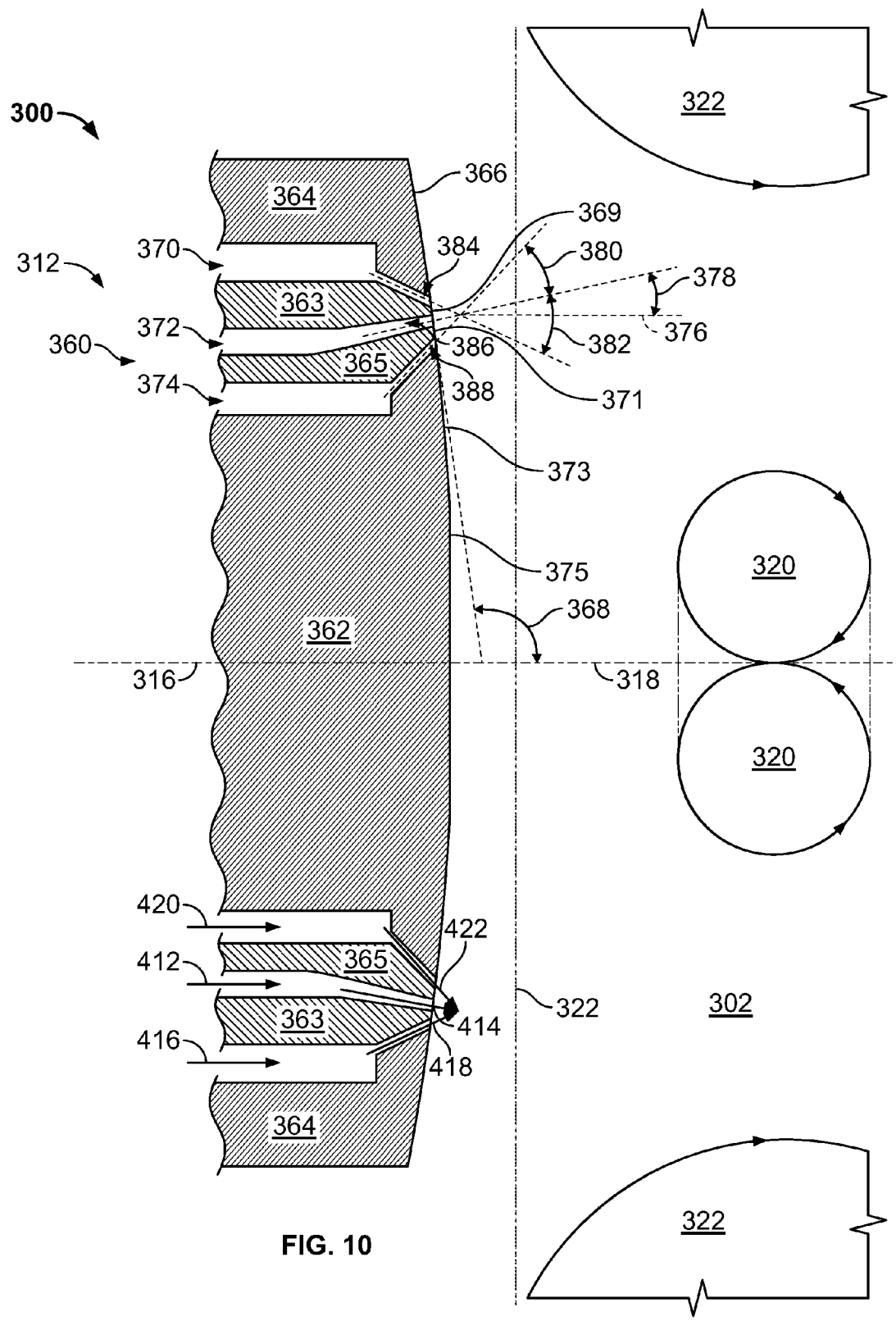
FIG. 10 is a schematic cross-sectional view of a portion of the injection device tip portion shown in FIGS. 4 and 5.

FIG. 10 is a schematic cross-sectional view of a portion of injection device tip portion 312, specifically, injector body 360. Slurry injection annulus 372 and injection port 386 are configured to facilitate channeling a slurry stream 412 into gasification cavity 302. Specifically, annulus 372 and port 386 are configured to cooperate with downstream apex 407 of flow splitter 400 (both shown in FIG. 9) to form a substantially continuous and uniform slurry sheet 414 that is discharged, or injected into gasification cavity 302 directed away from centerline 318 at angle 378. Slurry sheet 414 is also substantially annular and diverging.

Similarly, outer GOX injection annulus 370 and injection port 384 are configured to facilitate channeling an outer GOX stream 416 into gasification cavity 302. Specifically, annulus 370 and port 384 are configured to form a substantially continuous and uniform outer GOX sheet 418 that is discharged, or injected into gasification cavity 302 directed towards centerline 318 at angle 382 with respect to slurry sheet 414. Outer GOX sheet 418 is also substantially annular and converging.

Also, similarly, inner GOX injection annulus 374 and injection port 386 are configured to facilitate channeling a substantially continuous and uniform inner GOX stream 420 into gasification cavity 302. Annulus 374 and port 388 are configured to form a substantially continuous and uniform inner GOX sheet 422 that is discharged, or injected into gasification cavity 302 directed away from centerline 318 at angle 380 with respect to slurry sheet 414. Inner GOX sheet 422 is also substantially annular and diverging. In the exemplary embodiment, the inner GOX flow is approximately 50% of the total GOX flow through injection device 300 wherein the outer GOX flow accounts for the remaining approximately 50%. Alternatively, any ratio of inner GOX flow to outer GOX flow that facilitates operation of injection device 300 as described herein is used.

An exemplary method of producing a synthetic gas (syngas) (not shown) includes discharging, or injecting reactant streams 412, 416 and 420 into gasification reactor 208 via injection device 300. The method also includes mixing at least a portion of each of reactant streams 412, 416 and 420 such that recirculation zones 320 and 322 are defined by reactant streams 412, 416 and 420. The method further includes producing a syngas within recirculation zones 320 and 322 via mixing at least a portion of each of reactant streams 412, 416 and 420.

In operation, and referring to FIG. 10, a coal slurry (not shown) that includes coal and/or coal particles and water, with a consistency and viscosity that resembles wet cement, is channeled from material grinding and slurrying unit 211 to gasification reactor 208 via conduit 214 (all shown in FIG. 1). Specifically, the coal slurry is channeled to middle slurry section 323 of at least one injector feed assembly 319 (both shown in FIG. 3). Subsequently, the coal slurry is channeled to substantially annular slurry channel 338 within piping transition portion 330 (both shown in FIGS. 4 and 5) of each injection device 300. The coal slurry is further channeled to injector body 360 via walls 363 and 365 (shown in FIGS. 4 and 5). Specifically, the coal slurry is channeled to slurry injector annulus 372 to form slurry stream 412. Stream 412 is then channeled about flow splitters 400 (shown in FIG. 9), wherein diverging at least a portion of stream 412 into adjacent channels 401 (shown in FIG. 9) is facilitated such that the abrasive nature and flow plugging characteristics of the coal particles in stream 412 are mitigated.

The portions of stream 412 channeled through channels 401 recombine downstream of splitters 400 to form substantially continuous, uniform, annular and diverging slurry sheet 414 that is discharged, or injected into gasification cavity 302 via injection port 386 at angle 378 with respect to gasification cavity centerline 318. Injecting the slurry in this manner facilitates improving a residence time and a residence time distribution of the coal and/or coal particles within gasification cavity 302. Moreover, injecting slurry sheet 414 into cavity 302 in the form of a thin sheet that is readily broken up into small reactant droplets and are easily vaporized with improved atomization facilitates an increase of an efficiency and effectiveness of pyrolization and gasification of organic materials in the slurry.

Also, in operation, a fluid reactant, such as GOX, (not shown) is channeled from air separation unit 202 to gasification reactor 208 via conduit 210 (all shown in FIG. 1). Specifically, after appropriate pressure and flow control, the GOX is channeled to inner and outer $O_2$ sections 321 and 324, respectively of at least one injector feed assembly 319 (all shown in FIG. 3). In the exemplary embodiment, GOX streams that flow through sections 321 and 324 are facilitated by $O_2$ bypass line 325, wherein bypass 325 line 325 establishes at least some flow communication between sections 324 and 321 such that $O_2$ mass flow rate distribution is facilitated. Such $O_2$ mass flow rate distribution is facilitated based upon the cumulative $O_2$ pressure drop through each of $O_2$ flow paths of injector feed assembly 319. Therefore, maintaining a predetermined ratio of an outer $O_2$ mass flow rate to an inner $O_2$ mass flow rate (neither shown) is facilitated. Alternatively, methods that include, but are not limited to flow orifices and manually-operated and automated throttle valves are used in conjunction with, or in lieu of, bypass line 325.

GOX is channeled from sections 321 and 324 to substantially annular inner GOX channel 340 and substantially circular inner GOX channel 342, respectively, within piping transition portion 330 (all shown in FIGS. 4 and 5) of each injection device 300. The GOX is further channeled to injector body 360 via adaptor 350. Specifically, the GOX is channeled to substantially annular inner and outer GOX injector annuli 374 and 370, respectively, to form substantially annular inner and outer GOX streams 420 and 416, respectively. Streams 420 and 416 are then channeled through flow splitters wherein diverging and recombining at least a portion of streams 420 and 416 into annuli 374 and 370, respectively, and through injection ports 388 and 384, respectively, facilitates beneficial, as well as mitigates detrimental, flow characteristics of GOX streams 420 and 416.

Streams 420 and 416 form substantially continuous, uniform, annularly diverging, and annularly converging, inner and outer GOX sheets 422 and 418, respectively, that are discharged, or injected into gasification cavity 302 at angles 380 and 382, respectively, with respect to substantially annularly diverging slurry sheet 414. Injecting the GOX in this manner facilitates intersection of slurry sheet 414 and GOX streams 418 and 422 at predetermined angles with predetermined momentums that further facilitates atomization, thereby improving an efficiency of chemical reactions between the slurry and oxygen. Specifically, such intersection of sheets 414, 418 and 422 facilitates forming substantially toroidal recirculation zones 320 and 322. First recirculation zone 320 is formed close to and substantially centered about centerline 318. Second recirculation zone 322 is also substantially centered about centerline 318, and in close proximity to wall 304 (shown in FIG. 2). Recirculation zones 320 and 322 facilitate increasing a residence time and/or residence time distribution of the slurry and GOX such that a greater number of chemical reactions between the slurry and GOX occurs. Moreover, forming such recirculation zones 320 and 322 (shown in FIG. 2) facilitates a rate of heat release that subsequently facilitates vaporization of water in slurry stream 412. The configuration of annuli 370, 372, and 374, including ports 384, 386, and 388, respectively, facilitates forming the substantially toroidal shape of recirculation zones 320 and 322.

Further, in operation, fluid coolant is channeled from a coolant source (not shown) into coolant inlet plenum 354 (shown in FIG. 4) via cooling fluid inlet manifold 326 (shown in FIG. 3). The coolant is further channeled from plenum 354 to a plurality of circumferential and radial coolant channels 367 and 392, respectively, (both shown in FIG. 8) via standard channeling means (not shown). The coolant within channels 367 facilitates heat removal from portions of outer portion 364, including face 366. The channeling of coolant through channels 392 facilitates heat removal in center portion 362, including face 373 and surface 375. Moreover, the coolant within channels 392 is channeled through an axially downstream portion of flow splitters 400 (shown in FIG. 9) via channels 392 such that additional heat removal from center portion 362 of injector body 360 (all shown in FIGS. 8 and 9) is facilitated. The heated coolant is subsequently channeled from channels 367 and 392 to coolant outlet plenum 356 (shown in FIG. 4) via standard channeling means (not shown), and subsequently to cooling fluid outlet manifold 327 (shown in FIG. 3). This method provides cooling to facilitate protecting portions 362 and 364, mitigates molten coal particles from recirculation zones 320 and 322 adhering to portion 362 and 364, and mitigates molten coal particles from collecting around and clogging annuli 370, 372 and 374 and ports 384, 386, and 388, respectively.

Referencing FIGS. 2, 4, 5, 6, 7, 8, and 10, and the previous discussions of parameters associated with angles 368, 378, 380, and 382, face radial dimensions 393, 395, and 397, and injection port radial dimensions 394, 396, and 398, in the exemplary embodiment, a plurality of design and operational considerations associated with such parameters of such angles and dimensions are described in detail. Such design and operational considerations as discussed above include, but are not limited to, the abrasive nature and flow plugging characteristics of the coal particles in the slurry including erosion of wall 304 due to slurry impingement, intersecting the slurry and GOX streams at predetermined angles with predetermined momentums to facilitate mixing of the reactant streams thereby improving an efficiency of chemical reactions between the slurry and oxygen and improving a residence time of the coal particles from the slurry, forming recirculation zones 320 and 322 about line 318, thereby improving the effective residence time distribution of the fuel and GOX mixture, void formation within the slurry stream, slurry dispersion uniformity and variations in the GOX-to-fuel ratio, formation and vaporization of slurry droplets, the efficiency and effectiveness of pyrolization and gasification of the organic materials in the slurry, and a rate of production of syngas and ash by-products, as well as slagging, spallation, and heat retention associated with tip portion 312.

There are a number of additional design and operational considerations associated with the aforementioned parameters of angles 368, 378, 380, and 382, face radial dimensions 393, 395, and 397, and injection port radial dimensions 394, 396, and 398. For example, GOX injection ports 384's and 388's radial dimensions 394 and 398, respectively, each should have values such that a predetermined critical velocity and/or critical momentum of the oxygen reactant is exceeded as it exits injector tip portion 312. Also, for example, slurry injection port 386's radial dimension 396 should be at least slightly wider than a predetermined constant value that is derived from the largest expected particles in the slurry, thereby forming a lower limit for dimension 396. Moreover, a wetted perimeter (not shown) associated with port 386 should be sized such that the slurry flow exits port 386 at a velocity that facilitates exceeding a minimum shear stress of the slurry and the slurry sheet that forms will readily atomize, thereby cooperating to form an upper limit for a cross-sectional area of port 386. Consequently, if it's desirable to increase dimension 396 to accommodate larger slurry particle sizes, port 386 may be instead formed of a plurality of arcual annuli portion to ensure the slurry velocity through port 386 exceeds the minimum shear stress of the slurry. Similarly, each of annular ports 384, 386, and 388 may be comprised of a plurality of accrual annuli portions should space be required along the centerline of injector 300 to accommodate devices occupying a center portion of tip 312, such as but not limited to flame combustor 1300.

In the exemplary embodiment, injection device 300 is embedded within IGCC power generation plant 100. Alternatively, device 300 is embedded within any gasification system wherein device 300 facilitates operation of such gasification system as described herein.

Figure 11:
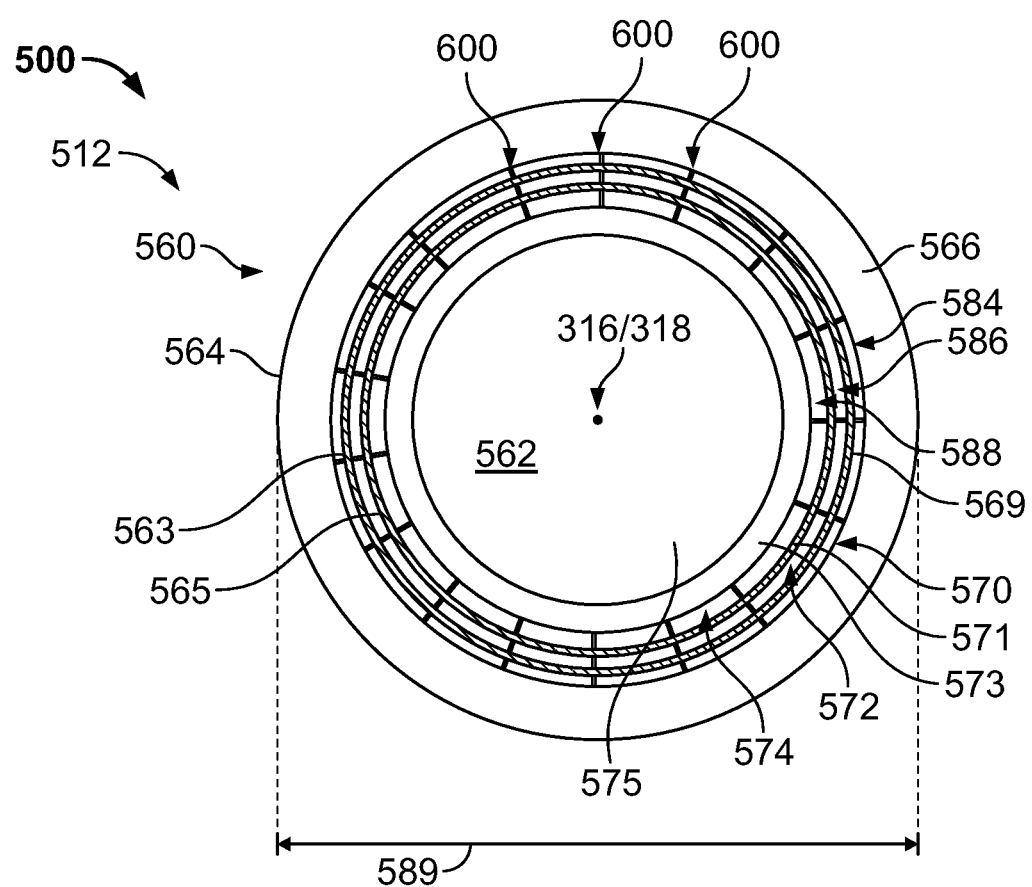
FIG. 11 is a schematic front view of an alternative injection device tip portion that may be used with the injector feed assembly shown in FIG. 3.

FIG. 11 is a schematic front view of an alternative injection device tip portion 512, specifically an alternative injector body 560, of an alternative injection device 500 that may be used with injector feed assembly 319 (shown in FIG. 3). Centerlines 316 and 318 and an alternative center portion 562, an outer annular portion 564, an alternative radially outer intermediate portion 563, and an alternative radially inner intermediate portion 565 are illustrated for perspective. In this alternative embodiment, injector body 560 has an external diameter 589 that is any value that facilitates operation of injection device 500 as described herein. A plurality of faces, that is, a first axially outer face 566, a second axially outer face 569, a third axially outer face 571, a fourth axially outer face 573, and a fifth axially outer face 575 are formed on injector body 560.

Portion 564 includes a plurality of annular outer GOX injection ports 584 that are positioned circumferentially about centerlines 316 and 318 to partially define an outer GOX injection port annulus 570. Each of plurality of ports 584 is circumferentially separated by an alternative flow splitter 600. Also, a plurality of annular slurry injection ports 586 that are positioned circumferentially about centerlines 316 and 318 partially define a slurry injection port annulus 572 positioned radially inward of annulus 570. Each of plurality of ports 586 is circumferentially separated by a flow splitter 600. Furthermore, a plurality of annular inner GOX injection ports 588 that are positioned circumferentially about centerlines 316 and 318 partially define an inner GOX injection port annulus 574 positioned radially inward of annulus 572. Each of plurality of ports 588 is circumferentially separated by a flow splitter 600.

In this alternative embodiment, annuli 570, 572 and 574 are defined and configured to facilitate forming substantially annularly diverging and converging sheets (not shown) via injection of the associated streams through the pluralities of associated injection ports 584, 586 and 588, respectively. Alternatively, any number and any configuration of injection ports 584, 586 and 588 to inject the associated streams in any stream configuration that facilitates operation of injection device tip portion 512 as described herein is used.

Figure 12:
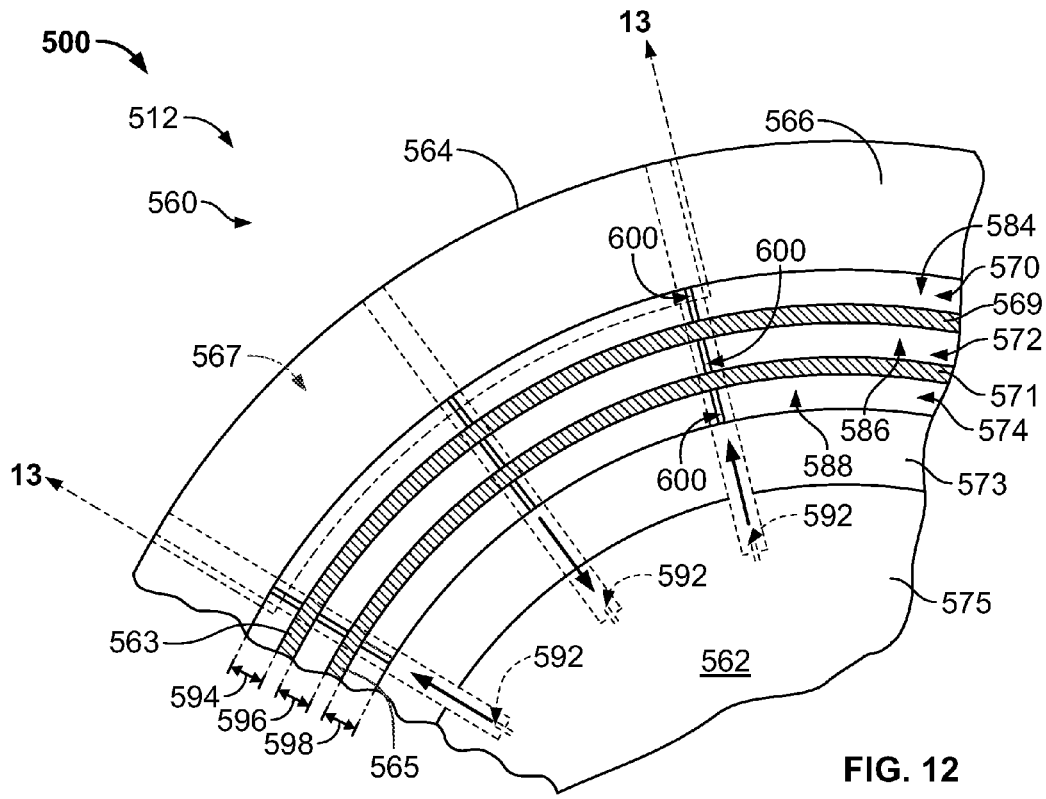
FIG. 12 is a schematic front view of a portion of the alternative injection device tip portion shown in FIG. 11.

FIG. 12 is a schematic front view of a portion of alternative injection device tip portion 512 of alternative injection device 500. Portion 512 includes a plurality of coolant channels 592 that cooperate with coolant inlet plenum 354 and coolant outlet plenum 356 (both shown in FIGS. 4 and 5) as well as a plurality of circumferential cooling channels 567 via standard channeling means (not shown). In the exemplary embodiment, alternating channels 592 are configured to channel a coolant radially inward and outward within tip portion 512 (as indicated by the solid arrows) to facilitate cooling tip portion 512, or, specifically, center portion 562, including faces 573 and 575, respectively, and cooling outer annular portion 564, including face 566. Alternatively, cooling radially outer and inner portions 563 and 565, including faces 569 and 571, respectively, also is facilitated by channels 592. Also, alternatively, any number of and any configuration of coolant channeling means, including, but not limited to, predefined channels and plenums within at least one cooling circuit (not shown) that facilitates operation of tip portion 512 as described herein is used. Still, further alternatively, structural support and alignment components, including, but not limited to, support rods, cooperate with channels 592, or, in lieu of channels 592. In the exemplary embodiment, the coolant is water. Alternatively, the coolant includes, but is not limited to, steam. Further, alternatively, any coolant may be used that facilitates cooling and operation of tip portion 512 as described herein. Cooling of tip portion 512 is substantially similar to that of tip portion 312 (shown in FIG. 8), and is discussed further below.

Slag adherence can occur whenever a temperature of tip portion 512 is above a slag stacking temperature, for example, above approximately 871 degrees Celsius (° C.) (1600 degrees Fahrenheit (° F.)). Therefore, in the exemplary embodiment, plenums 354 and 356, and channels 567 and 592 are configured to facilitate maintaining a temperature of tip portion 512, including, but not limited to, faces 566 and 575 within a range of approximately 204° C. (400° F.) to 649° C. (1200° F.), preferably 232° C. (450° F.) to 399° C. (750° F.). Alternatively, faces 566 and 575 have any configuration and/or orientation that facilitates cooling of faces 566 and 575 and facilitates operation of tip 512 as described herein.

Each of injection ports 584, 586, and 588 include a radial dimension 594, 596 and 598, respectively. Dimension 596, and the associated cross-sectional area of injection port 586, are sized to facilitate discharging, or injecting a thin slurry stream (not shown) through annulus 572 and injection port 586. Dimension 596, and the associated cross-sectional area of injection port 586, are oriented perpendicular to the thin slurry stream transitting through port 584. The thin slurry stream subsequently forms a thin sheet of slurry that is readily broken up into small reactant droplets that are easily vaporized, i.e., improving slurry atomization, thereby facilitating an increase of an efficiency and effectiveness of pyrolization and gasification of the organic materials in the slurry. Such increase in efficiency and effectiveness of pyrolization and gasification facilitates increasing a rate of production of syngas while decreasing a rate of production of ash by-products (neither shown). In the exemplary embodiment, dimension 596, and the associated cross-sectional area of injection port 586, have any values that facilitate operation of tip portion 512 as described herein.

Dimensions 594 and 598, and the associated cross-sectional areas, are perpendicular to flows of outer and inner GOX streams, respectively, discharging from ports 584 and 588, respectively, and are independently sized to facilitate mixing of the outer and inner GOX streams with the slurry stream, thereby facilitating an increase of an efficiency and effectiveness of pyrolization and gasification of the organic materials in the slurry. For example, methods of determining dimensions 594 and 598 include, but are not limited to, formulations of standard oxidant-to-fuel ratios and Reynolds, Weber, and Ohnesorge numbers as are known in the art. In the exemplary embodiment, dimensions 594 and 598, and the associated cross-sectional areas, are sized to facilitate distribution of GOX flow rates that produce adiabatic gasification temperatures within a range of approximately 1177° C. to 1482° C. (2150° F. to 2700° F.). Arc 13-13 illustrates a portion of tip portion 512 from a radial perspective.

Figure 13:
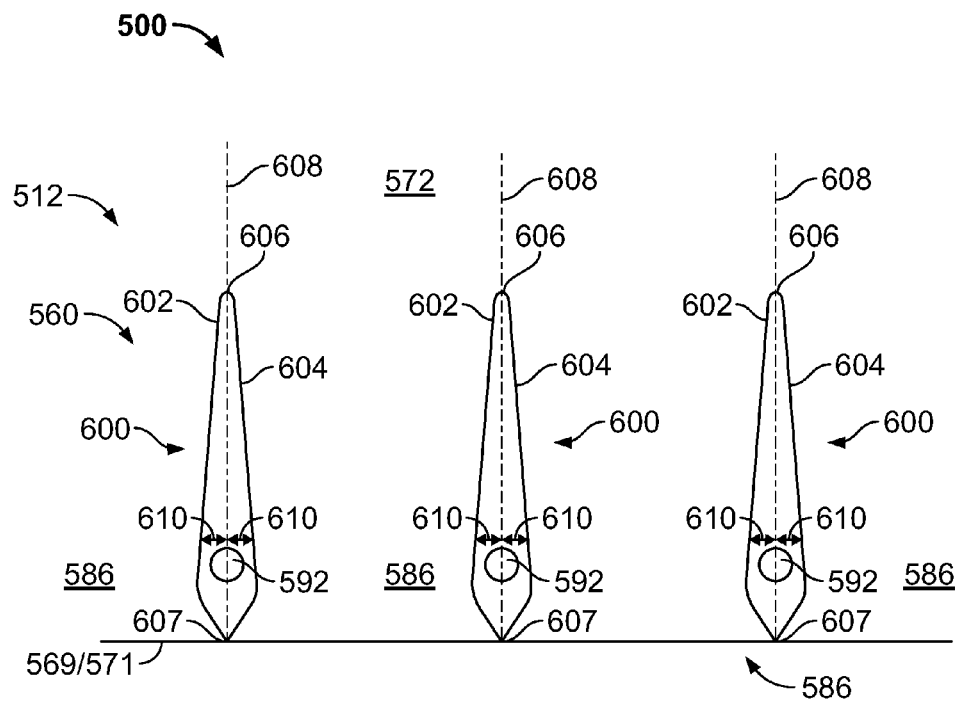
FIG. 13 is a schematic radial perspective view of a portion of the injection device tip portion shown in FIG. 12 taken along arc 13-13.

FIG. 13 is a schematic radial perspective view of a portion of alternative injection device tip portion 512 taken along arc 13-13 (shown in FIG. 12). Specifically, a plurality of flow splitters 600 are positioned within injector body 560 to facilitate separation and subsequent recombination of the slurry around channels 592, thereby protecting channels 592 and/or any structural members, including, but not limited to, rods and spacers (neither shown) extending through annulus 572, from slurry-induced erosion. Each flow splitter 600 is similar to splitter 400 (shown in FIG. 9) and includes a first side 602, an opposing second side 604 that at least partially defines injection ports 586. Each splitter 600 also includes an upstream apex 606 that is at least partially defined by a conjunction of sides 602 and 604. Each upstream apex 606 is substantially aligned with a line 608, wherein line 608 is substantially aligned with angle 378 (shown in FIG. 6) and substantially bifurcates splitter 600 including bisecting each apex 606 into two substantially congruent angles 610. Angles 610 facilitate diverging at least a portion of slurry flow received from slurry channel 338 (shown in FIG. 4) into adjacent ports 586 such that the abrasive nature and flow plugging characteristics of the coal particles in the slurry are mitigated. In this alternative embodiment, angles 610 have a value of approximately 3° to 15°. Alternatively, angles 610 have any value that facilitates operation of tip portion 512 as described herein.

Each of flow splitters 600 further include a downstream apex 607 that is at least partially defined by a conjunction of sides 602 and 604. In this alternative embodiment, apex 606 is slightly rounded to facilitate flow splitting and apex 607 is substantially pointed to facilitate recombination of the flow streams into thin a thin sheet upon exiting injection ports 586 downstream of flow splitters 600. Alternatively, apex 606 and apex 607 have any shape to facilitate operation of tip portion 512 as described herein.

In this alternative embodiment, downstream apices 607 of flow splitters 600 are substantially axially coplanar with faces 569 and/or 571. The shape of apex 607 is predetermined based on the recombinant characteristics of the slurry stream exiting ports 584 into gasification cavity 302. For example, but not being limited to, first side 602 and second side 604 may be configured to eliminate apex 607 for circumstances that include, but are not limited to, splitters 600 being separated sufficiently to facilitate predetermined conditions within cavity 302, wherein recombinant characteristics of the associated slurry stream are not desirable with respect to adjacent slurry injection ports 586 and GOX injection ports 584 and 588. Alternatively, flow splitters 600 are positioned within annulus 572 having any configuration and any orientation with respect to faces 569 and/or 571 that facilitates operation of injection device 500 as described herein.

In this alternative embodiment, annuli 570 and 574 (shown in FIG. 12) also include a plurality of flow splitters 600 to facilitate separation of reactant flow via apex 606 and subsequent recombination of reactant flow downstream of apex 607. Such flow splitting facilitates protection of channels 592 and/or any rods, spacers, or other structural support members extending through annuli 570 and/or 574, from reactant flow-induced erosion. However, the angles of the associated upstream and downstream apexes (neither shown) have values that facilitate predetermined reactant fluid flow characteristics associated with the particular reactant fluid.

Further, in this alternative embodiment, flow splitters 600 are formed about or attached to channels 592 and/or rods, or other structural members using standard methods of mechanical coupling. In other alternative embodiments, flow splitters 600 are an integral part of channels 592, and/or rods, and/or any other structural members extending through one or more annuli 570, 572 and 574. Further, in other alternative embodiments, flow splitters 600 are used instead of rods or other structural members to facilitate structural integrity and/or alignment of one or more annuli 570, 572, and 574. Still further, alternatively, at least one of flow splitters 600 is an integral part of tip portion 564, 563, 565, and/or 562.

Alternatively, portions of the radially inner portion, including face 571, and portions of the radially outer portion, including face 569, are cooled using coolant transported through a separate cooling water circuit (not shown) that includes at least one coolant inlet and at least one coolant outlet (neither shown). Further, alternatively, the portions of the radially inner portion, including face 571, and portions of the radially outer portion, including face 569, are cooled by any means that facilitates operation of the injector tip 500 as described herein. Also, alternatively, if center portion 562 is not cooled or center portion 562 is cooled via a separate cooling source (not shown) other than via channels 592, channels 592 are replaced with structural members to facilitate structural integrity and/or alignment of tip portion 512.

FIG. 14 is a schematic cross-sectional view of an alternative injector feed assembly 700 that may be used with gasification reactor 208 (shown in FIG. 2) with a flame lance 750 fully inserted. In this alternative embodiment, alternative injector feed assembly 700 includes a tip portion 712 that is similar to tip portion 312 (shown in FIG. 3). Also, in this alternative embodiment, assembly 700 includes an inner oxygen ($O_2$) supply section 721, a middle slurry section 723, and an outer $O_2$ supply section 724 that are similar to inner $O_2$ supply section 321, middle slurry section 323, and outer $O_2$ supply section 324, all shown in FIG. 3. Further, in this alternative embodiment, assembly 700 includes a cooling fluid inlet manifold 726 and cooling fluid outlet manifold 727 that are similar to cooling fluid inlet and outlet manifolds 326 and 327, respectively (both shown in FIG. 3). Moreover, in this alternative embodiment, assembly 700 includes a plurality of cooling fluid coils 728 and a mounting flange 729 that are similar to cooling fluid coils 328 and mounting flange 329, respectively (both shown in FIG. 3).

Also, in this alternative embodiment, alternative injector feed assembly 700 includes flame lance 750. Flame lance 750 is one of permanently installed or removable inserted. Moreover, in this alternative embodiment, flame lance 750 and tip portion 712 are separate components coupled to each other. Alternatively, flame lance 750 and tip portion 712 form an integrated unit. In this alternative embodiment, flame lance 750 includes an air inlet connection 752 that is coupled in flow communication with an air source (not shown). Further, alternative injector feed assembly 700 includes fuel inlet connection 754 that is coupled in flow communication with a fuel source (not shown). Moreover, assembly 700 includes an igniter and instrumentation package 756 that facilitates ignition of fuel channeled through fuel inlet connection 754. Alternatively, ignition and instrumentation features are integrated with assembly 700. Also, assembly 700 includes a plurality of purge and coolant connections 758 that are coupled in flow communication with appropriate purge and coolant liquid sources (not shown). Further, assembly 700 includes a flame discharge port 760 that emits a flame (not shown) as discussed further below. Moreover, assembly 700 includes a lance insertion passage 762 that is defined within assembly 700, wherein lance insertion passage facilitates insertion and removal of flame lance 750.

In operation, flame lance 750 is used to preheat refractory ceramic side wall 304 of gasification reactor 208 (both shown in FIG. 2) prior to or after gasification operation as described above.

FIG. 15 is a schematic cross-sectional view of alternative injector feed assembly 700 with flame lance 750 partially extracted. A removable flame lance 750 facilitates reducing design and operating requirements including, but not limited to, purging and insulation requirements for flame lance 750 during gasification operations. Flame lance 750 is inserted into, and removed from, lance insertion passage 762 in the directions of bi-directional arrow 770.

FIG. 16 is a schematic cross-sectional view of alternative injector feed assembly 700 with flame lance fully extracted 750 and an insert 780 ready to be inserted. In this alternative embodiment, insert 780 includes a purge connection 782 and a plurality of coolant connections 784 that are coupled in flow communication their associated fluid sources (not shown) when insert 780 is inserted into lance insertion passage 762. Alternatively, insert 780 is any combination of fully purged, partially purged, unpurged, uncooled, partially cooled, and fully cooled as operational circumstances dictate. Insert 780 is inserted into, and removed from, lance insertion passage 762 in the directions of bi-directional arrow 770

FIG. 17 is a schematic cross-sectional view of alternative injector feed assembly 700 with insert 780 fully inserted into lance insertion passage 762. Insert 780 facilitates filling the void volume, or lance insertion passage 762, and reducing a potential for escape of syngas and associated byproducts through lance insertion passage 762 during gasification operations as described above. Alternatively, other devices or equipment are inserted into lance insertion passage 762 after removal of flame lance 750 include, but are not limited to, feed piping and tips that are used to channel process feeds into the gasifier, such as but not limited to the GOX and/fuel streams in a manner similar to that described for injector feed assembly 319 (shown in FIG. 3). Moreover, alternatively, such other devices or equipment include, but are not limited to, temperature monitoring sensors, pressure monitoring sensors, syngas sampling devices, and material injection devices.

Figure 18:
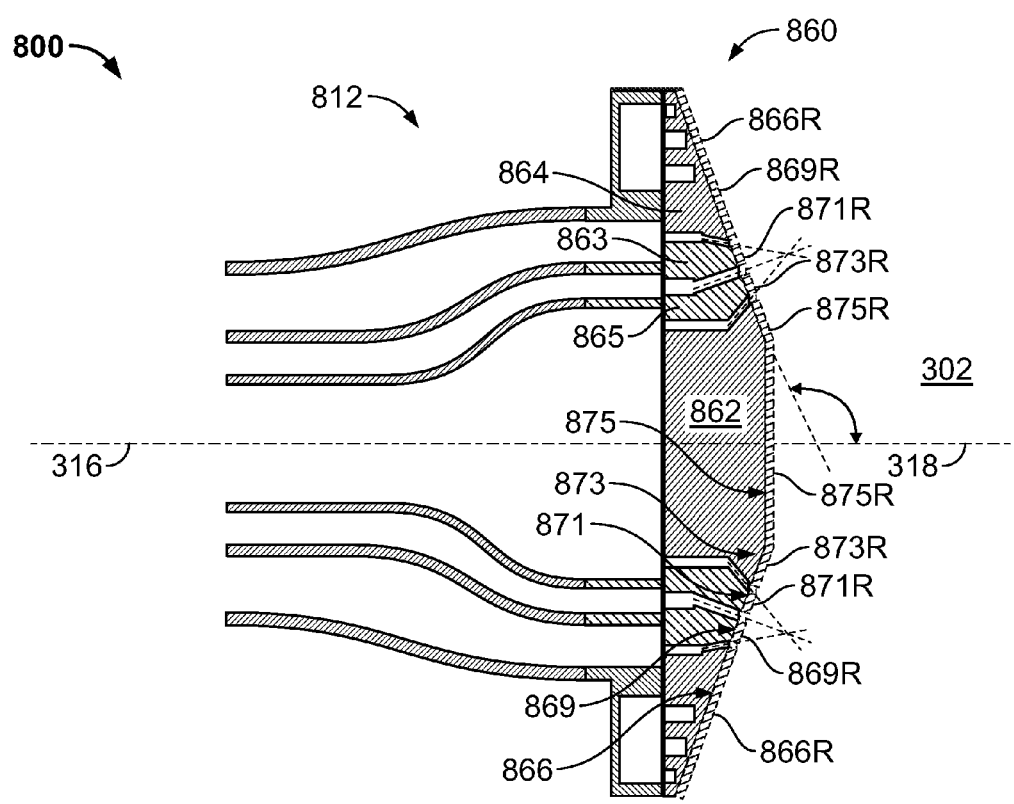
FIG. 18 is a schematic cross-sectional view of an alternative injection device tip portion that may be used with the injector feed assembly shown in FIG. 3.

FIG. 18 is a schematic cross-sectional view of an alternative injection device tip portion 812 that may be used with injector feed assembly 319 (shown in FIG. 3). Device tip portion 812 is a portion of an injection device 800 in a manner similar to that of device tip portion 312 and injection device 300 (both shown in FIG. 4). Device tip portion 812 extends about injection device axial centerline 316 substantially symmetrically, and portion 812 includes an injector body 860 that is similar to injector body 360 (shown in FIG. 4). Specifically, alternative injector body 860 includes a center portion 862, a radially outer intermediate portion 863, an outer portion 864, and a radially inner intermediate portion 865 that are similar to center portion 362, radially outer intermediate portion 363, outer portion 364, and radially inner intermediate portion 365, respectively (all shown in FIG. 4). Moreover, specifically, alternative injector body 860 defines a first radially outer face 866, a second radially outer face 869, a third radially outer face 871, a fourth radially outer face 873, and a radially outer surface 875, that similar to faces 366, 369, 371, 373 and surface 375, respectively (all shown in FIG. 4).

In this alternative embodiment, at least one layer of external refractory and/or ceramic material is formed over faces 866, 869, 871, and 873, and surface 875. Specifically, at least one layer of external refractory/ceramic coating 866R, 869R, 871R, 873R, and 875R is formed over at least a portion of at least one of faces 866, 869, 871, and 873, and surface 875, respectively. Also, in this alternative embodiment, neither of portions 862, 863, 864, and 865, including faces 866, 869, 871, and 873, and surface 875, are fluid-cooled. Alternatively, at least one of portions 862, 863, 864, and 865, including faces 866, 869, 871, and 873, and surface 875, is fluid-cooled. For example, surface 875 of center portion 862 can be cooled utilizing coolant channels (not shown) similar to coolant channels 392 (shown in FIG. 8) as described above. Alternatively, any combination of fluid cooling and external refractory/ceramic material is used that facilitates operation of alternative injector body 860 as described herein. Further, alternatively, alternative injector body 860 includes no fluid cooling and no external refractory/ceramic coatings, and is comprised of one or more materials, including but not limited to at least one refractory and/or ceramic material. For example, but not limited to, at least one of portions 862, 863, 864, and 865, including faces 866, 869, 871, and 873, and surface 875 are formed from refractory and or ceramic materials that have been manufactured using a casting process. Also, as an example, but not limited to, at least one of portions 862, 863, 864, and 865, including faces 866, 869, 871, and 873, and surface 875 are formed from refractory and or ceramic materials using a coating and/or layering process.

Figure 19:
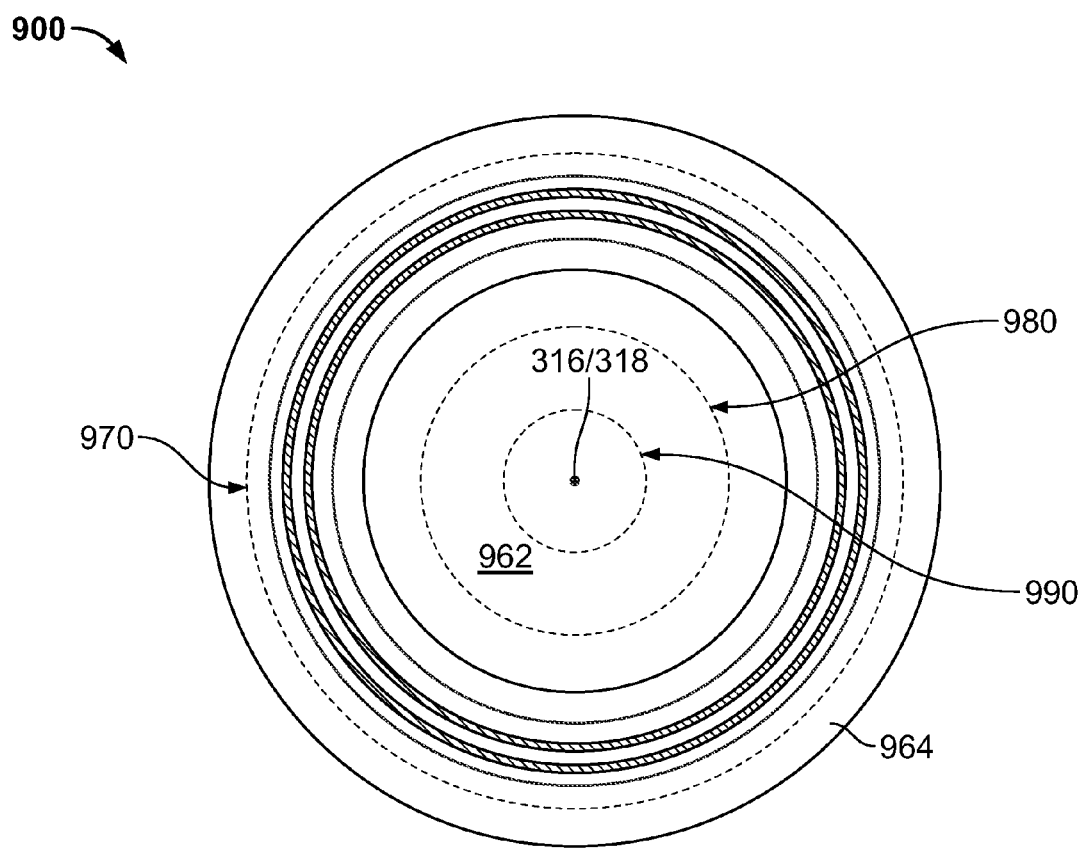
FIG. 19 is a schematic front view of an alternative injection device tip portion that may be used with the gasification reactor shown in FIG. 2.

FIG. 19 is a schematic front view of an alternative injection device tip portion 900 that may be used with gasification reactor 208 (shown in FIG. 2). Injection device axial centerline 316 and gasification cavity longitudinal centerline 318 are illustrated for perspective. Alternative injection device tip portion 900 is similar to injection device tip portion 312 (shown in FIG. 7) with the exception that portion 900 includes an alternative center portion 962 and an alternative outer annular portion 964 that, unlike center portion 362 and outer annular portion 364 (both shown in FIG. 7), define a plurality of feed openings, or more specifically, a first, or radially outer feed ring 970, a second, or radially intermediate feed ring, and a third, or radially inner feed ring 990. In this alternative embodiment, alternative center portion 962 and alternative outer annular portion 964 define any number of feed rings 970, 980, and 990 having any number of feed openings having any size and orientation that enables injection device tip portion 900 to operate as described herein.

Radially outer feed ring 970, radially intermediate feed ring 980, and radially inner feed ring 990 are used to discharge, or inject additional fluid (liquid and/or gaseous) feeds (not shown) into gasification reactor 208 (shown in FIG. 2, including, but not limited to, gaseous nitrogen and carbon dioxide. In this alternative embodiment, tip portion 900 includes at least one internal passage (not shown) that is dedicated to channeling the associated fluid. Also, in this alternative embodiment, rings 970, 980, and 990 include orifices (not shown) that facilitate distributing the additional fluid feed flows into gasification reactor 208. Further, in this alternative embodiment, the additional fluid feed flows advantageously facilitate cooling of tip portion 900 by removing heat from center portion 962 and annular outer portion 964 upon exiting. Moreover, in this alternative embodiment, cooling by the additional fluid feed flow are further facilitated by devices internal to tip portion 900 that include, but are not limited to, baffles and channels (neither shown). Also, in this alternative embodiment, radially outer feed ring 970, radially intermediate feed ring 980, and radially inner feed ring 990 include a predetermined sizing, spacing, number, and orientation, in conjunction with predetermined compositions and properties of the additional fluid feeds, to facilitate preventing excessive quenching of recirculation zones 320 and 322 (shown in FIGS. 2 and 10). Further, in this alternative embodiment, tip portion 900 includes similar cooling features as described for injector tip portions 312 and 512 (shown in FIGS. 8 and 12, respectively).

Alternatively, additional fluid feeds (not shown) are directed from at least one annular opening (not shown) concentrically aligned with and internal to an alternative inner GOX stream annulus (not shown) that is similar to inner GOX stream annulus 374 (shown in FIGS. 4, 5, 6, 7, and 8) to facilitate mixing of the additional fluid feeds with the oxygen and fuel feeds (not shown in FIG. 19). The additional fluid feed flows are oriented to produce at least one sheet of additional fluid feed that intersects with the sheets of oxygen and fuel (not shown in FIG. 19) at substantially the same axial distance (not shown in FIG. 19) from tip portion 900 as where the oxygen and fuel streams intersect.

Also, alternatively, the additional fluid feeds are directed from at least one annular opening (not shown) concentrically aligned with and external to an alternative inner GOX stream annulus (not shown) that is similar to inner GOX stream annulus 370 (shown in FIGS. 4, 5, 6, 7, and 8) to facilitate mixing of the additional fluid feeds with the oxygen and fuel feeds (not shown in FIG. 19). The additional fluid feed flows are oriented to produce a sheet of additional feed that intersects with the sheets of oxygen and fuel at substantially the same axial distance (not shown in FIG. 19) from tip portion 900 as where the oxygen and fuel streams intersect.

Further, alternatively, the additional fluid feeds are channeled from openings in center portion 962, both external to an alternative inner GOX stream annulus (not shown) that is similar to inner GOX stream annulus 374 (shown in FIGS. 4, 5, 6, 7, and 8) and internal to an alternative inner GOX stream annulus (not shown) that is similar to inner GOX stream annulus 370 (shown in FIGS. 4, 5, 6, 7, and 8). Also, alternatively, one or more additional feeds are channeled through one or more dedicated passages (not shown) in injector tip portion 900 and directed from one or more openings (not shown) concentrically aligned with and between either or both the inner GOX and fuel feed streams and the fuel and outer GOX feed streams (neither shown in FIG. 19). Moreover, alternatively, the additional fluid feeds form one of a gaseous or vapor feed stream (not shown), wherein one or more openings (not shown) for the additional feed streams are configured and oriented to direct at least a portion of the additional feed streams over one or more surfaces (not shown) of tip portion 900, either on a continuous or an intermittent basis, to facilitate limiting an accumulation of deposits (not shown) and surface cooling of tip portion 900, in a manner similar to sootblowing operations in commercial boilers. Still further, alternatively, tip portion 900 and/or parts thereof, are at least partially cooled by process fluids including, but not limited to, the fuel and/or the oxidant discharged, or injected into gasification reactor 208.

Also, alternatively, tip portion 900 is transpiration-cooled with a fluid bleed system (not shown). That is, portions of tip portion 900 including, but not limited to center portion 962 and annular outer portion 964 are manufactured from a porous material (not shown) that allows a low flow rate of fluids that are either liquid or gaseous. For example, but not limited to, those portions of injector tip portion 900 in direct thermal contact with high temperatures and chemical species in reactor 208 are made of porous metallic or refractory materials such as, but not limited to, porous plates or shapes formed by sintering metallic wire and/or powdered super alloys that are joined to the non-porous portions of injector tip portion 900 by one or more methods that include, but are not limited to, welding, brazing and other appropriate bonding techniques. Alternatively, retention hardware (not shown) is used. In this alternative embodiment, coolant flow rates are predetermined to facilitate prevention of quenching of recirculation zones 320 and 322.

Figure 20:
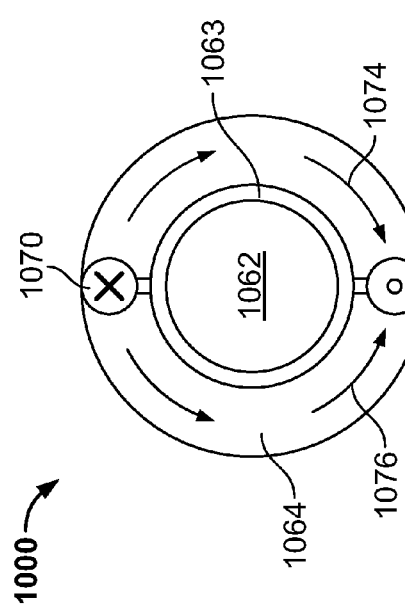
FIG. 20 is a schematic cross-sectional front view of an alternative injection device tip portion that may be used with the gasification reactor shown in FIG. 2.

FIG. 20 is a schematic cross-sectional front view of an alternative injection device tip portion 1000 that may be used with gasification reactor 208 (shown in FIG. 2). Tip portion 1000 includes a center portion 1062 and an outer annular portion 1064 separated by an injection annuli portion 1063. Tip portion 1000 also includes a coolant fluid supply header 1070 coupled in flow communication with coolant fluid inlet manifold 326 (shown in FIG. 3). Tip portion 1000 further includes a coolant fluid return header 1072 coupled in flow communication with coolant fluid outlet manifold 327 (shown in FIG. 3). Tip portion 1000 also includes at least one channel (not shown) to channel a portion of the coolant fluid in a clockwise direction 1074 from coolant fluid supply header 1070 to coolant fluid return header 1072. Tip portion 1000 further includes at least one channel (not shown) to channel a portion of the coolant fluid in a counter-clockwise direction 1076 from coolant fluid supply header 1070 to coolant fluid discharge header 1072. In this embodiment, fluid cooling is dedicated to outer annular portion 1064 and center portion 1062 is not fluid cooled.

Figure 21:
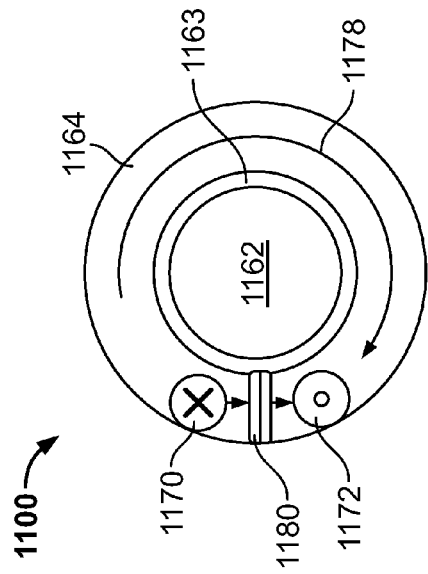
FIG. 21 is a schematic cross-sectional front view of an alternative injection device tip portion that may be used with the gasification reactor shown in FIG. 2.

FIG. 21 is a schematic cross-sectional front view of an alternative injection device tip portion 1100 that may be used with gasification reactor 208 (shown in FIG. 2). Tip portion 1100 includes a center portion 1162 and an outer annular portion 1164 separated by an injection annuli portion 1163. Tip portion 1100 also includes a coolant fluid supply header 1170 coupled in flow communication with coolant fluid inlet manifold 326 (shown in FIG. 3). Tip portion 1100 further includes a coolant fluid return header 1172 coupled in flow communication with coolant fluid outlet manifold 327 (shown in FIG. 3). Tip portion 1100 also includes at least one channel (not shown) to channel a portion of the coolant fluid in a clockwise direction 1178 from coolant fluid supply header 1170 to coolant fluid return header 1172. Tip portion 1100 further includes a flow divider 1180 that facilitates separation of flow communication between coolant fluid supply header 1170 and coolant fluid return header 1172 other than in clockwise direction 1178. In this embodiment, fluid cooling is dedicated to outer annular portion 1164 and center portion 1162 is either not fluid cooled or cooled by an alternative means.

Figure 22:
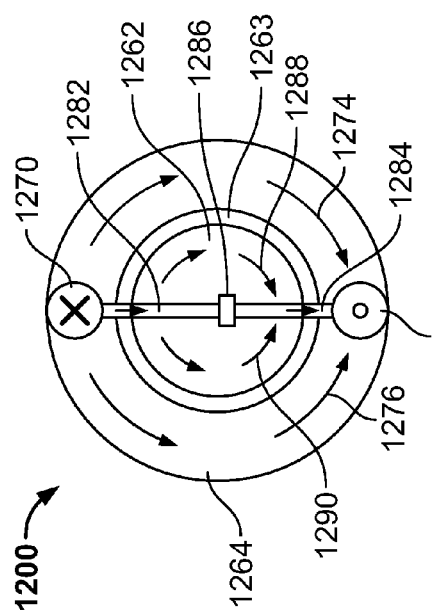
FIG. 22 is a schematic cross-sectional front view of an alternative injection device tip portion that may be used with the gasification reactor shown in FIG. 2.

FIG. 22 is a schematic cross-sectional front view of an alternative injection device tip portion 1200 that may be used with gasification reactor 208 (shown in FIG. 2). Tip portion 1200 includes a center portion 1262 and an outer annular portion 1264 separated by an injection annuli portion 1263. Tip portion 1200 also includes a coolant fluid supply header 1270 coupled in flow communication with coolant fluid inlet manifold 326 (shown in FIG. 3). Tip portion 1200 further includes a coolant fluid return header 1272 coupled in flow communication with coolant fluid outlet manifold 327 (shown in FIG. 3). Tip portion 1200 also includes at least one channel (not shown) to channel a portion of the coolant fluid in a clockwise direction 1274 from coolant fluid supply header 1270 to coolant fluid return header 1272. Tip portion 1200 further includes at least one channel (not shown) to channel a portion of the coolant fluid in a counter-clockwise direction 1276 from coolant fluid supply header 1270 to coolant fluid discharge header 1272. In this embodiment, fluid cooling is channeled to both outer annular portion 1264 and center portion 1262 is either not fluid cooled or cooled by an alternative means.

More specifically, alternative injection device tip portion 1200 includes a center portion supply manifold 1282 coupled in flow communication with coolant fluid supply header 1270. Tip portion 1200 also includes a center portion return manifold 1284 coupled in flow communication with coolant fluid return header 1272. Center portion supply manifold 1282 and center portion return manifold 1284 are separated by a flow divider 1286, wherein manifolds 1282 and 1284 and divider 1286 cooperate to form a cooling fluid flow in a clockwise direction 1288 and a cooling fluid flow in a counter-clockwise direction 1290 within center portion 1262.

Figure 23:
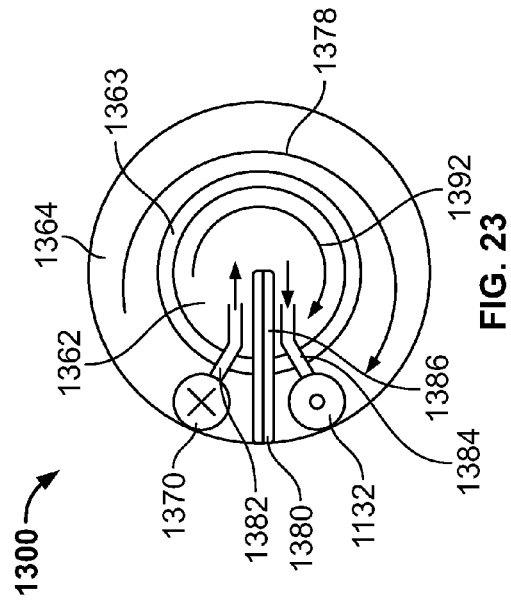
FIG. 23 is a schematic cross-sectional front view of an alternative injection device tip portion that may be used with the gasification reactor shown in FIG. 2.

FIG. 23 is a schematic cross-sectional front view of an alternative injection device tip portion 1300 that may be used with gasification reactor 208 (shown in FIG. 2). Tip portion 1300 includes a center portion 1362 and an outer annular portion 1364 separated by an injection annuli portion 1363. Tip portion 1300 also includes a coolant fluid supply header 1370 coupled in flow communication with coolant fluid inlet manifold 326 (shown in FIG. 3). Tip portion 1300 further includes a coolant fluid return header 1372 coupled in flow communication with coolant fluid outlet manifold 327 (shown in FIG. 3). Tip portion 1300 also includes at least one channel (not shown) to channel a portion of the coolant fluid in a clockwise direction 1378 from coolant fluid supply header 1370 to coolant fluid return header 1372. Tip portion 1300 further includes a flow divider 1380 that facilitates separation of flow communication between coolant fluid supply header 1370 and coolant fluid return header 1372 other than in clockwise direction 1378. In this embodiment, fluid cooling is channeled to both outer annular portion 1364 and center portion 1362.

More specifically, alternative injection device tip portion 1300 includes a center portion supply manifold 1382 coupled in flow communication with coolant fluid supply header 1370. Tip portion 1300 also includes a center portion return manifold 1384 coupled in flow communication with coolant fluid return header 1372. Center portion supply manifold 1382 and center portion return manifold 1384 are separated by an extension 1386 of flow divider 1380, wherein manifolds 1382 and 1384 and extension 1386 cooperate to form a cooling fluid flow in a clockwise direction 1392 within center portion 1362. Alternatively, manifolds 1382 and 1384 consist of a single conduit extending between center portion 1362 and an outer annular portion 1364 that includes an internal flow divider that extends into center portion 1362 and outer annular portion 1364, and facilitates such separation of flow communication between coolant fluid supply header 1370 and coolant fluid return header 1372 in center portion 1362 and outer annular portion 1364.

The annular triplet concept for injectors is fully scalable. That is, in an alternative embodiment, variations of tip portion 312 (shown in FIGS. 4, 5, 6, 7, 8, and 10) and tip portion 512 (shown in FIGS. 11 and 12) include multiple sets of the annular triplet configuration, wherein each set is disposed along and concentrically aligned about injector axis 318 (shown in FIGS. 2, 3, 4, 5, 6, 7, 10, and 11). For example, but not limited to, in a double triplet embodiment, injector tip 312 employs a series of successively larger annuli, including an inner or first triplet comprised of the an inner most first inner GOX annulus, a first fuel annulus, and a first outer GOX annulus, and an outer or second triplet comprised of a second inner GOX annulus, a second fuel annulus, and a second outer GOX annulus. In one embodiment, successive annuli that are used to inject the same feed into the gasifier are supplied from a common passage, conduit or header within injector 300 (shown in FIGS. 2, 3, 4, 5, 7, 8, and 10) and injector 500 (shown in FIGS. 11 and 12) controlling the flow split between the annuli. In still another alternative embodiment, an array of annular triplets is incorporated into one or more injector bodies.

Figure 24:
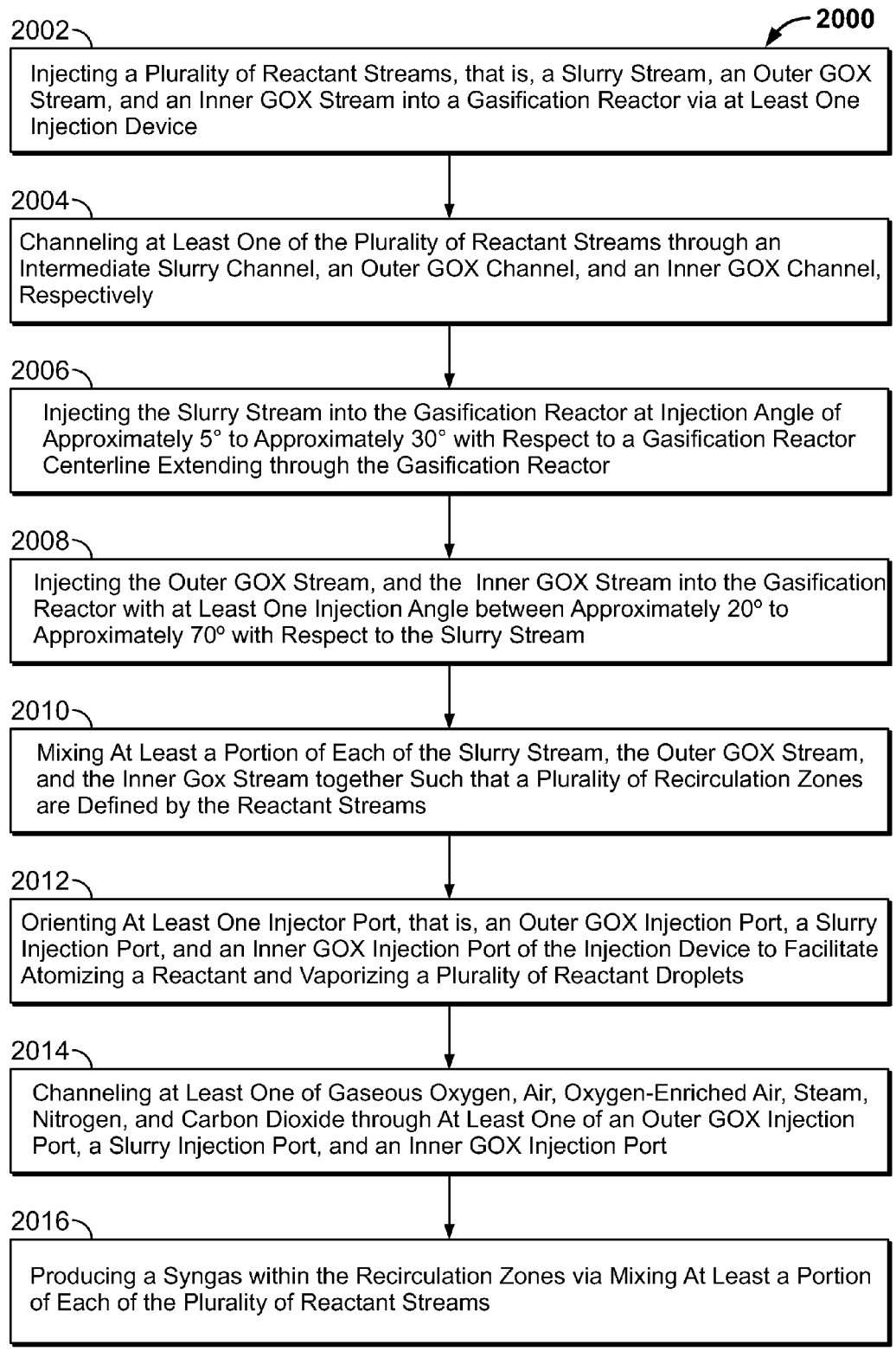
FIG. 24 is a flow chart of an exemplary method of producing a synthetic gas (syngas) with the IGCC power generation plant shown in FIG. 1.

FIG. 24 is a flow chart of an exemplary method 2000 of producing a synthetic gas (syngas) with IGCC power generation plant 100 (shown in FIG. 1). A plurality of reactant streams, that is, slurry stream 412, outer GOX stream 416, and inner GOX stream 420 are injected 2002 into gasification reactor 208 via at least one injection device 300 having a plurality of injection annuli 370/372/374 by channeling 2004 at least one of plurality of reactant streams 412, 416, and 420 through a passage, that is, intermediate slurry channel 338, outer GOX channel 340, and inner GOX channel 342, respectively. Injection device 300 also includes an inner portion, that is, center portion 362 that extends annularly about centerline 316 extending through injection device 300 and outer portions 363, 364, and 365 extending substantially annularly about center portion 362. At least a portion of outer portions 363, 364, and 365 is oriented obliquely with respect to injection device centerline 316. A first reactant stream, that is, a carbonaceous reactant stream, or slurry stream 412 is injected 2006 into gasification reactor 208 at injection angle 378 of greater than 0°, or more specifically, between approximately 5° to approximately 30° with respect to gasification reactor centerline 318 extending through gasification reactor 208. A plurality of second reactant streams, that is, outer GOX stream 416, and inner GOX stream 420 are injected 2008 into gasification reactor 208 with at least one injection angle 380 and/or 382 between approximately 20° to approximately 70° with respect to slurry stream 412, such that slurry stream 412 mixes with outer GOX stream 416 and inner GOX stream 420 at a pre-determined distance from injection device 300.

At least a portion of each of the plurality of reactant streams, that is, slurry stream 412, outer GOX stream 416, and inner GOX stream 420 are mixed 2010 together such that a plurality of recirculation zones 320 and 322 are defined by the reactant streams. Recirculation zones 320 and 322 have a toroidal shape and are concentrically aligned about gasification reactor centerline 318, wherein the toroidal shape is one of substantially spatially continuous and at least partially spatially segmented. At least one injector port, that is, outer GOX injection port 384, slurry injection port 386, and inner GOX injection port 388 of injection device 300 is oriented 2012 to facilitate atomizing a reactant and vaporizing a plurality of reactant droplets. Moreover, at least one of outer GOX injection port 384, slurry injection port 386, and inner GOX injection port 388 channels 2014 at least one of gaseous oxygen, air, oxygen-enriched air, steam, nitrogen, and carbon dioxide through the injection device.

A syngas is produced 2016 within recirculation zones 320 and 322 via mixing at least a portion of each of the plurality of reactant streams, that is, slurry stream 412, outer GOX stream 416, and inner GOX stream 420.

The method and apparatus for synthetic gas, or syngas, production as described herein facilitates operation of a gasification system, such as a gasification system integrated with a combined-cycle power generation plant, integrated gasification combined-cycle (IGCC) power generation plants, specifically, syngas production systems, and more specifically, gasification reactors. Specifically, injecting syngas production fluid streams into the gasification reactor at predetermined orientations increases syngas production efficiency. More specifically, forming substantially annular sheets of the reactant streams and intersecting them as described herein facilitates forming recirculation zones. Moreover, forming the recirculation zones facilitates increasing an effective residence time and/or residence time distribution of the reactants in relation to each other such that a greater efficiency and effectiveness of chemical reactions between the reactants occurs. Furthermore, configuring the reactant injection ports with predetermined dimensions facilitates forming small reactant droplets that are easily vaporized with improved atomization, thereby facilitating an increase of an efficiency and effectiveness of pyrolization and gasification of the reactants. The increased efficiency and effectiveness of pyrolization and gasification facilitates increasing a rate of production of syngas while decreasing a rate of production of ash and char by-products. Fabricating and operating the gasification reactor as described herein facilitates optimally operating the syngas production process to facilitate improving gasification system and IGCC plant production efficiency, thereby facilitating a reduction in capital and operating costs. Furthermore, the method and equipment for producing such syngas as described herein facilitates reducing capital costs associated with fabricating such IGCC plant.

Exemplary embodiments of syngas production as associated with IGCC plants are described above in detail. The methods, apparatus and systems are not limited to the specific embodiments described herein or to the specific illustrated IGCC plants. While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An injection device comprising:
a center face extending substantially perpendicularly to an axial centerline extending through said injection device;
an inner portion that extends annularly about said center face, said inner portion comprising an inner conical face oriented at an obtuse angle relative to said axial centerline; and
an outer portion extending substantially annularly about said inner portion, said outer portion comprising an outer conical face oriented at an obtuse angle relative to said axial centerline, said outer portion surrounding said inner portion and said center face; said outer portion comprising:

at least one annular carbonaceous reactant injection port coupled to a source of carbonaceous material and oriented obliquely with respect to said injection device centerline;

at least one first annular reactant injection port radially inward from said at least one annular carbonaceous injection port;

at least one second annular reactant injection port radially outward from said at least one annular carbonaceous injection port, wherein the at least one first and second annular reactant injection ports are oriented obliquely with respect to the at least one annular carbonaceous reactant injection port;

each of said at least one first and at least one second annular reactant injection ports coupled to a source of at least one of gaseous oxygen, air, oxygen-enriched air, steam, nitrogen, and carbon dioxide.

2. An injection device in accordance with claim 1, wherein said inner portion comprises at least one inner face oriented substantially perpendicularly to said injection device centerline.

3. An injection device in accordance with claim 1, wherein at least one of said at least one first annular reactant injection port and said at least one second annular reactant injection port further comprises a plurality of reactant injection ports configured to inject a reactant stream therefrom.

4. An injection device in accordance with claim 3, wherein at least one of said plurality of reactant injection ports and said at least one annular carbonaceous reactant injection port are configured to define a plurality of recirculation zones at a predetermined distance from said injection device.

5. An injection device in accordance with claim 4, wherein said plurality of reactant injection ports comprise:

a first fluid injection port oriented to discharge a first reactant fluid stream for mixing with a carbonaceous reactant stream; and a second fluid injection port oriented to discharge a second reactant fluid stream for mixing with the carbonaceous reactant stream.

6. An injection device in accordance with claim 5, wherein said plurality of reactant fluid injection ports further comprise a plurality of injector port slots defined by a plurality of flow splitters, at least one of said plurality of flow splitters at least partially defines at least one of at least one coolant channel; and at least one mechanical support device.

7. An injection device in accordance with claim 5, wherein at least one of said at least one annular carbonaceous reactant injection port, said first fluid injection port, and said second fluid injection port is sized to facilitate atomizing a reactant discharged therefrom.

8. An injection device in accordance with claim 1, wherein said at least one annular carbonaceous reactant injection port comprises a plurality of injector port slots defined by a plurality of flow splitters, at least one of said plurality of flow splitters at least partially defines at least one of:

at least one coolant channel; and at least one mechanical support device.

9. An injection device in accordance with claim 1 further comprising a tip portion comprising at least one of at least one coolant channel defined within at least a portion of said tip portion; and at least one layer of refractory formed over at least a portion of said tip portion.

10. An injection device in accordance with claim 1, wherein at least one of said inner portion and said outer portion comprises at least a partially porous material that facilitates transpiration cooling of at least one of said inner portion and said outer portion.

11. An injection device in accordance with claim 1, wherein said at least one of said inner portion and said outer portion comprises at least one coolant injection port oriented to channel at least one cooling fluid through said injection device.

12. A gasification system comprising:

at least one carbonaceous reactant source;

at least one oxygenated reactant source; and at least one gasification reactor comprising at least one injection device coupled in flow communication with said at least one carbonaceous reactant source and with said at least one oxygenated reactant source, said at least one injection device comprising:

a center face extending substantially perpendicularly to an axial centerline extending through said injection device;

an inner portion that extends annularly about said center face, said inner portion comprising an inner conical face oriented at an obtuse angle relative to said axial centerline; and an outer portion extending substantially annularly about said inner portion, said outer portion comprising an outer conical face oriented at an obtuse angle relative to said axial centerline, said outer portion surrounding said inner portion and said center face; said outer portion comprising:

at least one annular carbonaceous reactant injection port oriented obliquely with respect to said injection device centerline, said at least one annular carbonaceous reactant injection port configured to discharge material therefrom in a diverging annular sheet;

at least one first annular reactant injection port radially inward from said at least one annular carbonaceous injection port and configured to discharge material therefrom in a diverging annular sheet;

at least one second annular reactant injection port radially outward from said at least one annular carbonaceous injection port and configured to discharge material therefrom in one of a diverging annular sheet, a cylindrical annular sheet, and a converging annular sheet, wherein the at least one first and second annular reactant injection ports are oriented obliquely with respect to the at least one annular carbonaceous reactant injection port.

13. A gasification system in accordance with claim 12, wherein said inner portion comprises at least one inner face oriented substantially perpendicularly to said injection device centerline.

14. A gasification system in accordance with claim 12, wherein at least one of said at least one first annular reactant injection port and said at least one second reactant injection port further comprises a plurality of oxygenated reactant injection ports that are each configured to discharge an oxygenated reactant stream at a predetermined injection angle that facilitates mixing of the oxygenated reactant stream and a carbonaceous reactant stream.

15. A gasification system in accordance with claim 14, wherein at least one of said plurality of oxygenated reactant injection ports and said at least one annular carbonaceous reactant injection port define a plurality of recirculation zones a predetermined distance from said injection device.

16. A gasification system in accordance with claim 15, wherein said plurality of oxygenated reactant injection ports comprises at least one of:

a first oxygenated reactant injection port oriented to inject a first oxygenated reactant stream such that the first oxygenated reactant stream is mixed with a carbonaceous reactant stream; and a second oxygenated reactant injection port oriented to inject a second oxygenated reactant stream such that the second oxygenated reactant stream is mixed with the carbonaceous reactant stream.

17. A gasification system in accordance with claim 16, wherein said plurality of oxygenated reactant injection ports further comprises a plurality of injector port slots defined by a plurality of flow splitters, at least one of said plurality of flow splitters at least partially defines at least one of:

at least one coolant channel; and at least one mechanical support device.

18. A gasification system in accordance with claim 16, wherein at least one of said at least one annular carbonaceous reactant injection port, said first oxygenated reactant injection port, and said second oxygenated reactant injection port is sized to facilitate atomizing a reactant discharged therefrom.

19. A gasification system in accordance with claim 12, wherein said at least one annular carbonaceous reactant injection port comprises a plurality of injector port slots defined by a plurality of flow splitters, at least one of said plurality of flow splitters at least partially defines at least one of:

at least one coolant channel; and at least one mechanical support device.

20. A gasification system in accordance with claim 12, further comprising a tip portion comprising at least one of:

at least one coolant channel defined within at least a portion of said tip portion; and at least one layer of refractory formed over at least a portion of said tip portion.

21. A gasification system in accordance with claim 12, wherein said at least one of said inner portion and said outer portion comprises at least one coolant injection port configured to channel at least one cooling fluid through said injection device such that the at least one cooling fluid exits said injection device.

22. A gasification system in accordance with claim 12 further comprising at least one injector feed assembly coupled in flow communication with said at least one oxygenated reactant source and said injection device, wherein said at least one injector feed assembly comprises an oxygenated reactant bypass conduit.

\* \* \* \* \*